(12) United States Patent
Jiang et al.

(10) Patent No.: US 8,185,293 B2
(45) Date of Patent: May 22, 2012

(54) FUEL COMPOSITION RECOGNITION AND ADAPTATION SYSTEM

(75) Inventors: Li Jiang, Ann Arbor, MI (US); Nestor H. Oliverio, Ann Arbor, MI (US); Anna G. Stefanopoulou, Ann Arbor, MI (US); Hakan Yilmaz, Ann Arbor, MI (US)

(73) Assignee: Robert Bosch LLC, Broadview, IL (US)

( * ) Notice: Subject to any disclaimer, the term of this patent is extended or adjusted under 35 U.S.C. 154(b) by 720 days.

(21) Appl. No.: 12/417,240

(22) Filed: Apr. 2, 2009

(65) Prior Publication Data
US 2009/0306875 A1 Dec. 10, 2009

Related U.S. Application Data

(60) Provisional application No. 61/059,056, filed on Jun. 5, 2008, provisional application No. 61/098,916, filed on Sep. 22, 2008.

(51) Int. Cl.
*F02D 45/00* (2006.01)
*G01M 15/08* (2006.01)
*F02M 7/28* (2006.01)

(52) U.S. Cl. .................................... 701/102; 73/114.55

(58) Field of Classification Search .................. 701/102, 701/103–105, 115; 73/114.55, 114.38, 114.56, 73/114.45; 123/435–436
See application file for complete search history.

(56) References Cited

U.S. PATENT DOCUMENTS

| | | | |
|---|---|---|---|
| 4,905,648 A | 3/1990 | Washino et al. | |
| 4,905,649 A | 3/1990 | Washino et al. | |
| 4,920,494 A | 4/1990 | Abo et al. | |
| 4,993,388 A | 2/1991 | Mitsumoto | |
| 5,050,555 A | 9/1991 | Mitsumoto | |
| 5,121,732 A | 6/1992 | Benninger et al. | |
| 6,298,838 B1 | 10/2001 | Huff et al. | |
| 7,159,448 B2 | 1/2007 | Moelkner et al. | |
| 7,225,787 B2 | 6/2007 | Bromberg et al. | |
| 7,628,062 B2 | 12/2009 | Healy et al. | |
| 7,793,536 B2* | 9/2010 | Schenck Zu Schweinsberg et al. | 73/114.55 |
| 8,032,294 B2* | 10/2011 | Loeffler et al. | 701/111 |
| 8,042,384 B2* | 10/2011 | Bailey | 73/114.38 |
| 2002/0083927 A1 | 7/2002 | Bayerle et al. | |
| 2006/0102145 A1 | 5/2006 | Cohn et al. | |

(Continued)

FOREIGN PATENT DOCUMENTS

DE 4117440 12/1991

(Continued)

OTHER PUBLICATIONS

International Search Report and Written Opinion for PCT/US2009/046222, dated Mar. 29, 2010, 11 pages.
Notice of Allowance for U.S. Appl. No. 12/126,086, dated May 17, 2010, 7 pages.

(Continued)

*Primary Examiner* — Hieu T Vo
(74) *Attorney, Agent, or Firm* — Michael Best & Friedrich LLP

(57) ABSTRACT

A method of operating an internal combustion engine. The method including monitoring a pressure in a combustion chamber of the engine during a compression stroke, determining whether a fuel composition has changed from a first composition to a second composition based at least in part on the monitored pressure, and triggering a fuel composition adaptation in response to a determination that the fuel composition has changed.

20 Claims, 11 Drawing Sheets

U.S. PATENT DOCUMENTS

| | | |
|---|---|---|
| 2006/0102146 A1 | 5/2006 | Cohn et al. |
| 2008/0006252 A1 | 1/2008 | Kramer |
| 2008/0289401 A1 | 11/2008 | Boerkel |
| 2008/0289405 A1 | 11/2008 | Schenck Zu Schweinsberg et al. |
| 2009/0064682 A1 | 3/2009 | Healy et al. |
| 2009/0223485 A1 | 9/2009 | Hamedovic et al. |

FOREIGN PATENT DOCUMENTS

| | | |
|---|---|---|
| JP | 1285853 | 11/1989 |

OTHER PUBLICATIONS

Nestor H. Oliverio, et al., Modeling the Effect of Fuel Ethanol Concentration on Cylinder Pressure Evolution in Direct-Injection Flex-Fuel Engines, publication, Jun. 10, 2009, 8 pages, 2009 American Control Conference, St. Louis, Missouri, USA.

Nestor H. Oliverio, et al., Ethanol detection in flex-fuel direct injection engines using in-cylinder pressure measurements, publication, Apr. 20, 2009, 13 pages, 2009-01-0657, 2009 SAE World Congress, USA.

* cited by examiner

| Properties | Unit | Gasoline | E85 |
|---|---|---|---|
| Calorific Value $\Delta H_c^0$ | MJ/kg | 42.5 | 29.1 |
| Stoichiometric Air-Fuel Ratio $AFR_s$ | - | 14.8 | 9.8 |
| Octane | RON | >91 | >108* |
| Boiling Temperature | °C | 25...215 | ~78 |
| Evaporation Enthalpy $h_{evap}$ | kJ/kg | 380...500 | ~800* |

(* approximated values)

Lambda and Combustion Analysis

Compression Analysis

FUEL COMPOSITION RECOGNITION AND ADAPTATION SYSTEM

RELATED APPLICATIONS

This patent application claims priority to U.S. Provisional Patent Application Ser. No. 61/059,056 filed Jun. 5, 2008 and U.S. Provisional Patent Application Ser. No. 61/098,916 filed Sep. 22, 2008, the entire contents of which are hereby incorporated by reference.

STATEMENT REGARDING FEDERALLY SPONSORED RESEARCH AND DEVELOPMENT

This invention was made with Government support under contract DE-FC26-07NT43274 awarded by the DOE. The Government has certain rights in this invention.

BACKGROUND

The present invention relates to fuel control systems, and more particularly, to a method of determining the fuel composition in a flexible fueled vehicle.

Environmental and energy independence concerns have stimulated the development of alternative transportation fuels for use in automobiles and other vehicles. In addition to gasoline as the traditional fuel used in spark-ignition engines, hydrogen, natural gas, alcohol fuel or fuel mixtures of gasoline and alcohol fuel, for example, are used as fuels in spark-ignition or internal combustion engines and are hereafter referred to as spark-ignition fuels. Alcohol fuels are popular alternative fuels and include methanol, ethanol, butanol, and others fuels known in the art.

Different spark-ignition fuels have varying physical properties. As a result, internal combustion engines operate differently when supplied with different fuels. Prior art attempts to operate an engine with multiple spark-ignition fuels modified the engine to run with a "worst case" fuel composition. However, the use of such a variety of spark-ignition fuels produces many scenarios wherein a "worst case" tuned engine does not operate with an acceptably high efficiency. Modern engines, equipped with variable ignition and valve actuation, offer the possibility of changing many engine settings to optimize engine behavior for each fuel used. Therefore, it is desired to determine the composition of the spark-ignition fuel being supplied to the engine and modify the engine's operation settings accordingly such that the engine may operate with the best possible efficiency.

There have been several prior art attempts to accurately and effectively determine and/or monitor the fuel composition of an internal combustion engine. The most straightforward solution is to implement a fuel composition sensor. However, fuel composition sensors can be prohibitively expensive or provide limited reliability. Other solutions include monitoring the exhaust system using existing exhaust sensors and control systems.

U.S. Pat. Nos. 4,920,494 and 4,905,649 both provide systems that utilize combustion chamber pressure data taken during a combustion event to determine a fuel composition and make corrections to the engine's operation settings.

SUMMARY

Prior art attempts to provide a low cost system that can accurately and effectively monitor the fuel composition of an internal combustion engine have drawbacks. For example, a system that relies on monitoring the exhaust system may take several minutes to warm-up and provide proper readings. This warm-up period can present an unacceptable lag in emissions performance. In addition, the sensors and control systems currently used in exhaust systems provide and analyze a large amount of data for various monitoring applications such that adding yet another demand on the sensors and associated control systems may have detrimental effects on the current functionality.

In other prior art systems, such as those discussed in the background section, a combustion event must be monitored to properly determine a fuel composition. Combustion events are complicated and involve many variables dependant on both the fuel composition and other external factors. Monitoring a combustion event may not provide satisfactory accuracy and response time to properly determine the fuel composition of a fuel entering the combustion chamber.

The invention provides a solution to the long standing problem of providing a reliable fuel composition detection system that may be used independently or in coordination with other systems to accurately and effectively detect the fuel composition in an internal combustion engine such that modifications to the engine settings may be made to most efficiently utilize a variety of fuels and fuel mixtures. Specifically, a combustion chamber pressure and crank-angle position are monitored during the compression stroke, prior to ignition, and may be used to determine a fuel composition.

Monitoring the parameters of the combustion chamber during a compression stroke, prior to ignition, provides reliable data that may be used to determine the fuel composition when compared to known properties of various fuels. For example, the heat and pressure required to vaporize gasoline, various ethanol blends, and other fuels is different, and as such, the pressure versus inferred volume curves during the compression stroke will be different according to the fuel composition. Additionally, various gasoline manufacturers produce different fuel blends with different compositions and/or octane ratings that exhibit different properties and behave differently during the compression stroke. The different fuel compositions have different intrinsic properties, such as boiling temperature and evaporation enthalpy, that may be measured or calculated. The differences in the curves may be used to differentiate one fuel from another.

In one embodiment, the invention provides a method of operating an internal combustion engine. The method includes monitoring a pressure in a combustion chamber of the engine during a compression stroke, determining whether a fuel composition has changed from a first composition to a second composition based at least in part on the monitored pressure, and triggering a fuel composition adaptation in response to a determination that the fuel composition has changed.

In another embodiment, the invention provides a method of operating an internal combustion engine. The method includes monitoring a pressure in a combustion chamber of the engine during a compression stroke, determining whether a fuel composition has changed from a first composition to a second composition based at least in part on the monitored pressure, activating a fuel composition adaptation in response to a determination that the fuel composition has changed, determining that the fuel composition has reached a steady-state condition after activating the fuel composition adaptation, deactivating the fuel composition adaptation in response to a determination that the fuel composition has reached the steady-state condition, and determining whether the fuel composition has changed from the second fuel composition to a third fuel composition based at least in part on the monitored pressure after deactivating the fuel composition adaptation. Monitoring the pressure in the combustion chamber of the engine includes determining a characteristic feature of the fuel that is a function of the pressure in the combustion chamber of the engine during the compression stroke.

Other aspects of the invention will become apparent by consideration of the detailed description and accompanying drawings.

versus volume that represents conditions within the combustion chamber during the compression stroke.

Figure 12:
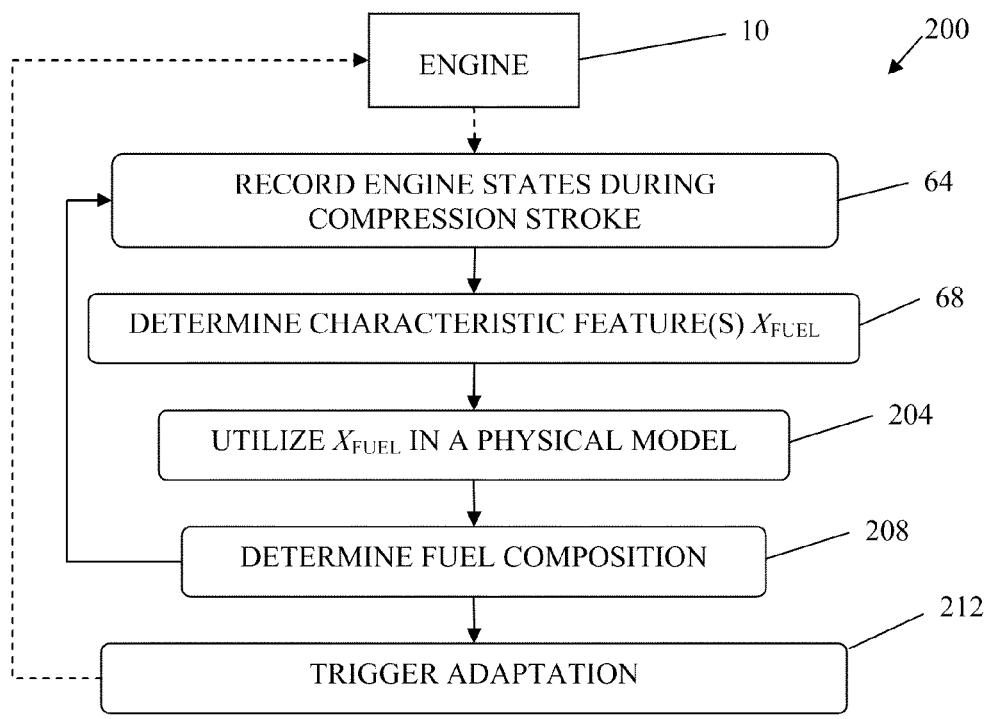

FIG. 12 is a flow chart corresponding to another embodiment of the invention.

Figure 13:
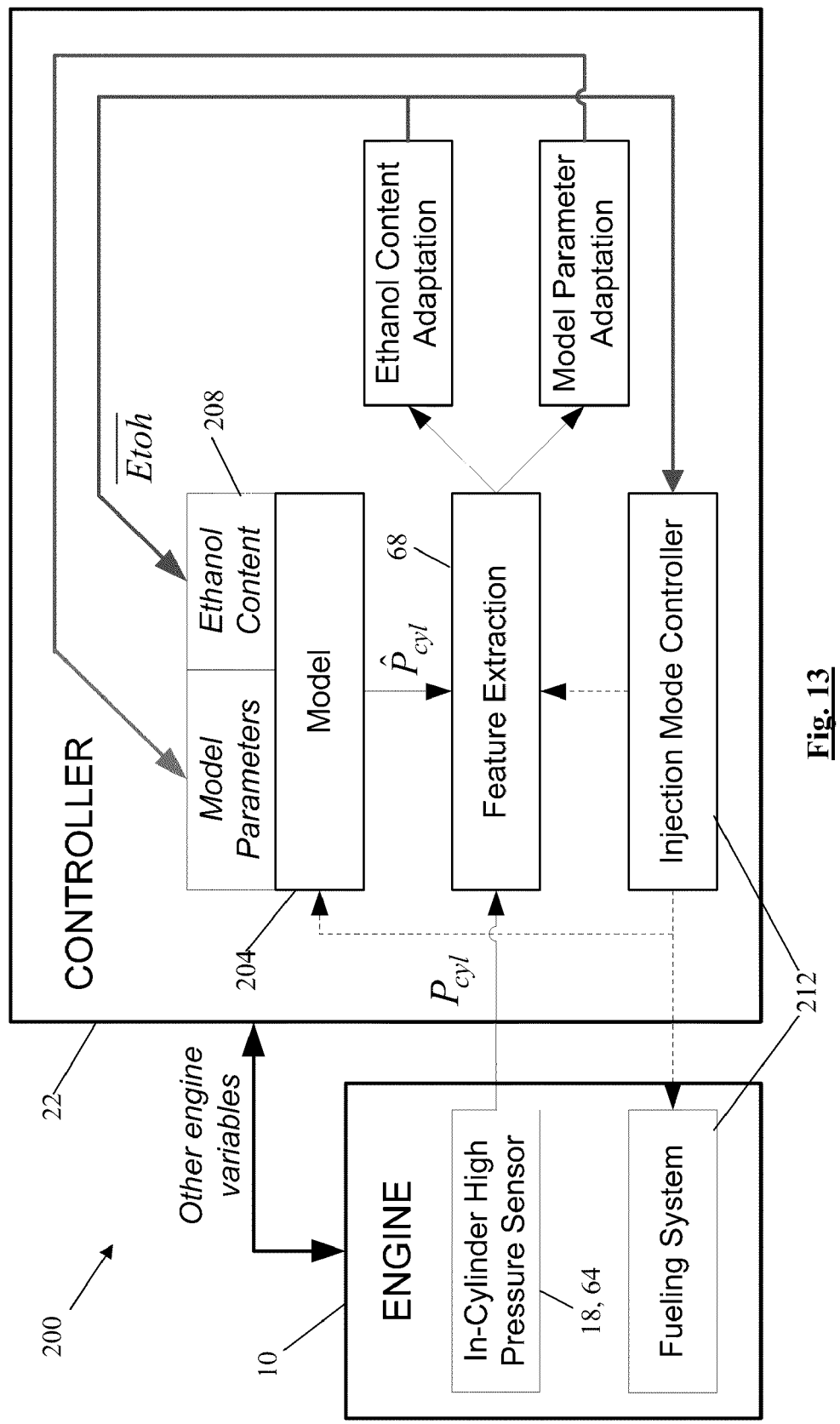

FIG. 13 is a flow chart corresponding to flow chart of FIG. 12.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Within the context of the present description, all fuels with which a spark-ignition engine can fundamentally be operated are referred to as spark-ignition fuel or fuels. Specifically, the description will reference ethanol, although it is considered that the invention may be practiced with any number of other spark-ignition fuels or mixture of fuels including natural gas, propane, methane, gasoline, and other fuels known by those skilled in the art. Furthermore, the invention may be practiced in compression-ignition engines with non-spark-ignition fuels such as diesel fuel, bio-diesel, and other non-spark-ignition fuels known by those skilled in the art.

Flex-Fuel Vehicles are capable of running with multiple fuels and fuel types. Specifically, Flex-Fuel Vehicles often operate with ethanol-gasoline mixture fuels. One embodiment of the invention is utilized with Flex-Fuel Vehicle (FFV) applications wherein detection of an ethanol content or fuel composition of the fuel is beneficial to the efficient operation of the FFV's engine. Other embodiments of the invention may be utilized with different engine types and with different fuels (e.g. Flex-Fuel diesel engines and diesel/bio-diesel).

Figure 1:
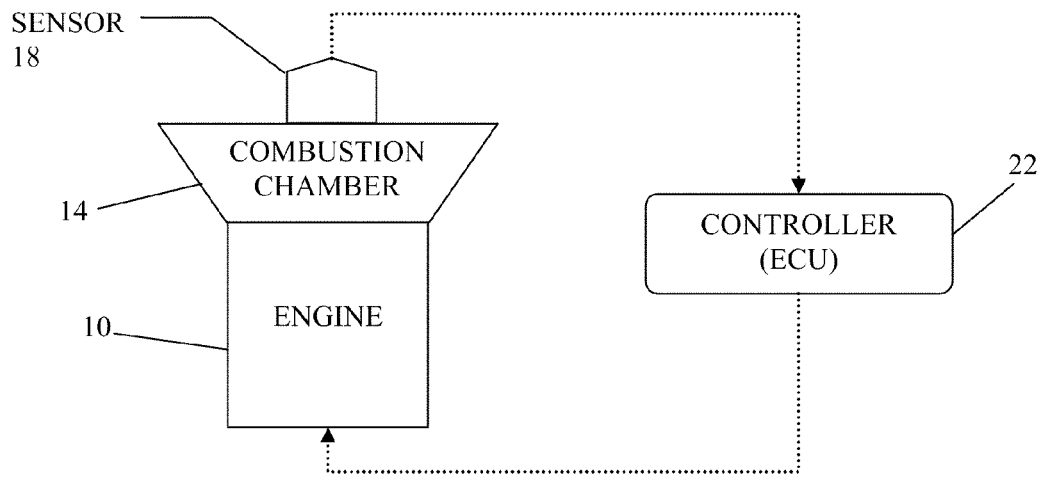
FIG. 1 is a schematic representation of a system with which the invention may be used.

FIG. 1 shows an engine 10 that includes a cylinder, a piston, and a cylinder head (not shown). The illustrated engine 10 is an internal combustion engine. More specifically, the illustrated engine 10 is a FFV engine (e.g. an automobile engine) equipped with direct-injection, and includes multiple cylinders, pistons, and cylinder heads, as is known by those skilled in the art. Each cylinder, piston, and cylinder head cooperate to define a combustion chamber 14. The combustion chamber 14 defines a dynamic combustion chamber volume that changes as the piston moves within the cylinder. When the piston is at a point farthest from the cylinder head, the combustion chamber volume is a maximum, and as the piston moves toward the cylinder head, the combustion chamber volume decreases. The standard arrangement and operation of internal combustion engines is well known by those skilled in the art and will not be discussed in detail. Typical automobile engines include three, four, six, or eight cylinders. In other embodiments, the engine may have a different number of cylinders, pistons, and cylinder heads. For example, a single cylinder engine is contemplated. The arrangement of the engine should not in any way limit the scope of the invention and it is contemplated to use the invention with any other internal combustion engine types such as rotary stroke engines, opposed piston engines, or compression-ignition engines in addition to other engine types, as desired.

Briefly, the piston moves in the cylinder toward the cylinder head during a compression stroke, and away from the cylinder head during an expansion or combustion stroke. In addition, in a four stroke engine (automobile engine), the piston moves toward the cylinder head during an exhaust stroke after the combustion stroke, and away from the cylinder head during an intake stroke after the exhaust stroke. During the compression stroke, an air/fuel mixture is provided within the combustion chamber and the combustion chamber volume decreases as the piston moves toward the cylinder head until the piston reaches top dead center and a pre-spark combustion chamber pressure is at a maximum. Subsequently, during the combustion stroke, a spark is produced in the combustion chamber 14 such that the air/fuel mixture is ignited and the piston is forced away from the cylinder head until the piston reaches bottom dead center. During the exhaust stroke, the combustion products are exhausted out of the cylinder, and during the subsequent intake stroke, a new air charge enters the combustion chamber. After the exhaust stroke and the intake stroke, another compression stroke begins. In other embodiments, a two-stroke engine may be used, in which case the cycle of the engine would operate accordingly, as is known by those skilled in the art.

A sensor 18 is positioned in the combustion chamber 14 such that the sensor 18 may detect a pressure within the combustion chamber. For example, a pressure sensor similar to that disclosed in U.S. Pat. No. 7,159,448 may be used. U.S. Pat. No. 7,159,448 is incorporated by reference herein in its entirety. The data measured by the sensor 18 may be used for multiple applications, but the fuel composition detection is based on or at least triggered by the data recorded during the compression stroke.

A controller 22 may be an engine control unit (ECU) and receives the data from the sensor 18. The illustrated controller 22 interprets the data and uses it to at least trigger a determination routine, if not to also actually determine the fuel composition. Based on the determined fuel composition, the controller 22 modifies the engine's operation settings such that the engine 10 most efficiently utilizes the air/fuel mixture within the combustion chamber 14. The controller 22 alone or in combination with other controllers or processors also performs and/or coordinates other engine and vehicle system functions including those discussed further below.

Figure 2:
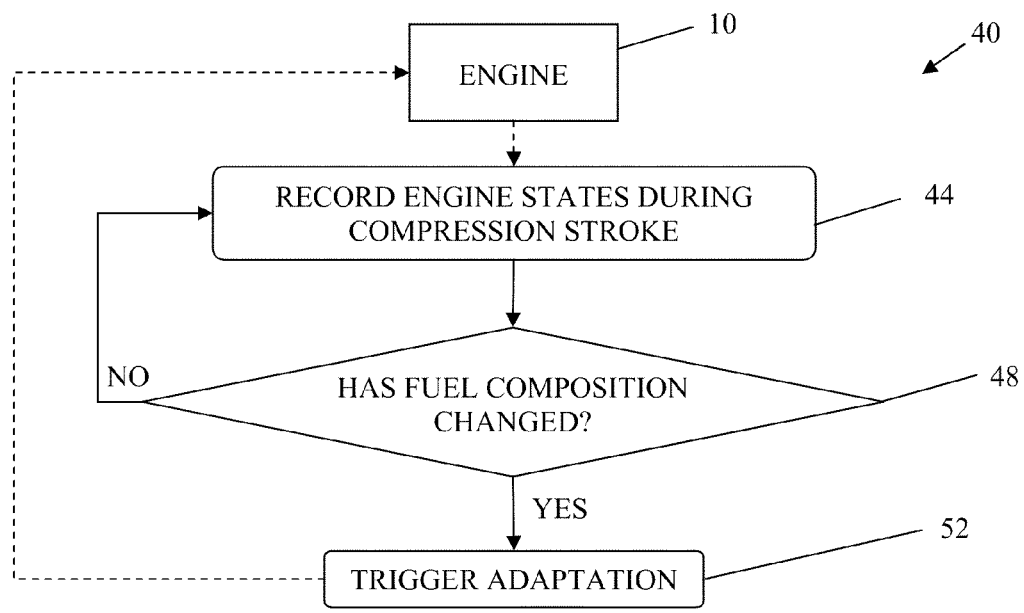
FIG. 2 is a flowchart corresponding to an embodiment of the invention.

A first embodiment of the operation of the invention will be described with reference to FIG. 2. According to the illustrated method 40, as the piston moves toward the cylinder head during the compression stroke, the controller 22 records the combustion chamber pressure via the sensor 18 at block 44. The chamber pressure may be recorded at block 44 for one or more cycles during which different engine settings may be adjusted, such as ignition and injection timing modes (see FIG. 5).

At block 48 the controller 22 analyzes the data collected at block 44 and determines the state of the fuel composition based on the combustion chamber pressure recorded during the compression stroke. With regard to this application, the fuel composition state indicates whether the fuel composition is changing (transient-state) or is constant (steady-state). A transient-state indicates that the fuel composition is changing or has changed (i.e., has gone through a transient-state) from a first composition to a second composition different from the first composition. For example, if the controller 22 collects data at block 44 during a first time and a second time, the controller 22 may determine a first composition at the first time, and a second composition at the second time that is different from the first composition. The controller 22 may recognize that a change has occurred between the first time and the second time and determine that the fuel composition has changed.

If the controller 22 recognizes that the fuel composition is changing or has changed (transient-state) at block 48, a fuel composition adaptation is triggered at block 52. As used herein and in the appended claims, the phrase "fuel composition adaptation" means an adaptation of the engine operating parameters based on a change in fuel composition. In one embodiment, the fuel composition adaptation modifies the engine's operation settings such that the engine 10 oxidizes the air/fuel mixture within the combustion chamber 14 more efficiently. In addition, the fuel composition adaptation may include a fuel composition estimation wherein the system estimates or calculates the physical composition of the fuel mixture within the combustion chamber 14. In other embodiments, the fuel composition adaptation may enact other engine adaptations, change settings, trigger other systems, or make other adjustments, as desired.

The combustion chamber pressure during the compression stroke is recorded at block 44. In addition, the combustion chamber volume and the engine coolant temperature are also recorded and other engine parameters may be recorded at block 44. For example, an exhaust gas sensor and an intake air flow sensor may be employed to provide additional information to the controller 22.

Determination of the fuel composition state at block 48 includes utilizing the data collected by one or more of the sensors at block 44 during the compression stroke of the engine 10. The controller 22 will recognize that the fuel composition is in a transient-state and trigger the fuel composition adaptation at block 52. During the compression stroke, the different fuels exhibit different pressure profiles and the controller 22 is able to accurately determine that the state of the fuel composition is the same (steady-state), or is changing or has changed (transient-state), within the combustion chamber 14.

The fuel composition adaptation can determine the fuel composition and can be used to adjust the engine's operation settings to more efficiently oxidize the fuel within the combustion chamber 14. For example, the volume of fuel injected into the combustion chamber may be altered, a torque structure of the engine may be changed, starting and warm-up conditions may be altered to more efficiently oxidize the fuel present, the air/fuel ratio may be altered dependant on the engine coolant temperature, and/or the intake and exhaust valve timing as well as the injection and ignition timing dependent on the in-cylinder pressure measurements, and emissions system adjustments may be made including catalytic converter heating and lambda (air/fuel) control. Other adjustments may also be made to better tune the system to efficiently combust the fuel, as desired. Further detail regarding fuel composition recognition and adaptation will be discussed below.

At block 48, the method 40 returns to block 44 if the fuel composition is unchanging (steady-state) and continues to record engine states. The method 40 may be repeated a number of times to accurately and reliably determine the fuel composition state. In addition, the method 40 may be utilized during a starting of the engine 10, upon a triggering event (e.g. a refueling event), continuously during operation, intermittently during operation, on a timed schedule, or at any other time.

The collection of data at block 44, and the determination of fuel composition state at block 48, may be processed in a non-sequential manner and may overlap in real-time. For example, the algorithm embedded in block 48 may process the data once they are collected at block 44 or only after sufficient data is available.

In one embodiment, the method 40 monitors the state of the fuel composition by continuously cycling through blocks 44 and 48 such that a change in fuel composition may be recognized at any time during the operation of the FFV. In addition, the method 40 may be used for other purposes, such as recognizing engine actuator faults or a faulty sensor that could be misinterpreted as a fuel composition change.

Figure 3:
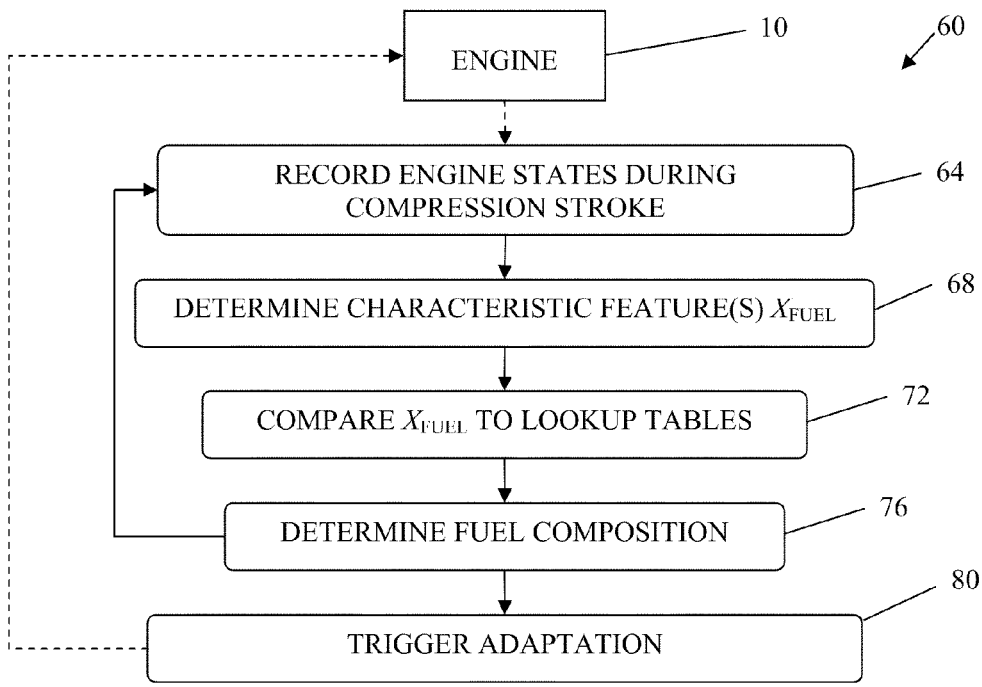
FIG. 3 is a flow chart corresponding to another embodiment of the invention.

One way in which the method 40 may be utilized is shown in FIG. 3. The illustrated method 60 provides a method of recognizing the fuel composition state and determining the fuel composition based on data collected during the compression stroke of the engine 10. In the illustrated embodiment, the method 60 may accurately detect the fuel composition and adapt the system operating conditions in under one minute. Specifically, the invention aims to make the appropriate adaptations in under thirty seconds. In addition, other time goals may be set for recognition and determination of the fuel composition and adaptation thereafter as desired. For example, it is a goal to minimize the time required for fuel composition recognition, to maximize the accuracy of the determination, or to find a suitable balance or compromise between minimizing the time and maximizing the accuracy in which the system is adapted based on the determined fuel composition.

Figure 5:
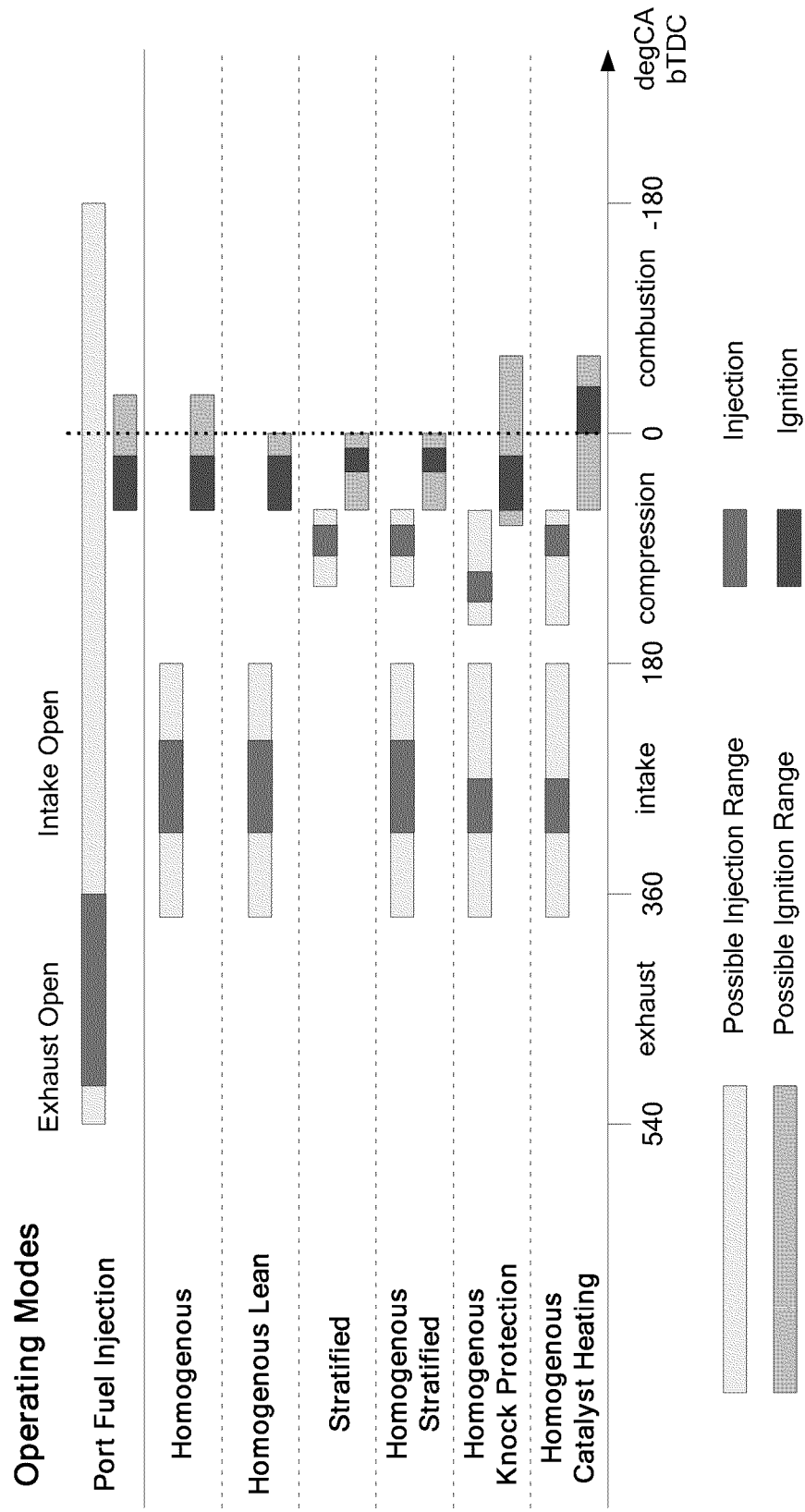
FIG. 5 is a chart of various engine operating modes.

During operation of the engine 10, the controller 22 records various engine states and parameters (e.g., combustion chamber pressure) during the compression stroke at block 64. FIG. 5 shows a variety of engine operating modes with different injection and ignition schedules that the engine 10 may utilize during operation. In some embodiments, additional parameters and states may be recorded or monitored as desired. For example, the method 60 may monitor the crank-shaft position, combustion chamber volume, the mass or volume of air entering the combustion chamber, and a fuel-factor $f_{lambda}$ as determined by an Exhaust Gas Oxygen (EGO) sensor in the exhaust system. The fuel-factor $f_{lambda}$, as continuously adapted in the controller 22, is an indication of the stoichiometric oxidation of the fuel within the combustion chamber 14. For example, when the fuel-factor $f_{lambda}$ is greater than one, the engine 10 is operating with an insufficient amount of fuel, as calculated by the controller 22, such that the air/fuel mixture does not achieve a stoichiometric combustion. A fuel-factor $f_{lambda}$ greater than one compensates for an error in the feedforward fuel calculation or an injector drift. The error in the feedforward fuel calculation may arise from a misinterpreted fuel composition (e.g., the predetermined stoichiometric air/fuel ratio in the controller 22 is too high), an over estimated mass or volume of air in the air/fuel mixture, or other factors. In response to a non-unity fuel-factor $f_{lambda}$, adaptations can be implemented to account for the above-mentioned errors so that the feedforward fuel calculation is corrected and the fuel-factor $f_{lambda}$ returns to its default value of one. During normal engine operations, the fuel-factor $f_{lambda}$ should be one to achieve ideal combustion.

Figure 4:
FIG. 4 is a chart of various fuel properties.
Figure 4:

When sufficient data is recorded at block 64, various parameter identification techniques can be employed at block 68 to determine a characteristic feature(s) $X_{fuel}$ from the data collected at block 64. In one embodiment, the characteristic feature $X_{fuel}$ is a function of the physical fuel properties and may be directly measured, calculated, obtained from lookup tables, experimentally modeled, or derived through physical models, experimental data or any combination of methods, as desired. FIG. 4 shows various physical fuel properties for gasoline and E85 fuel (ethanol/gasoline mixture). The controller 22 may utilize the pressure data recorded within the combustion chamber 18 during the compression stroke to determine a characteristic feature $X_{fuel}$.

Figure 11:
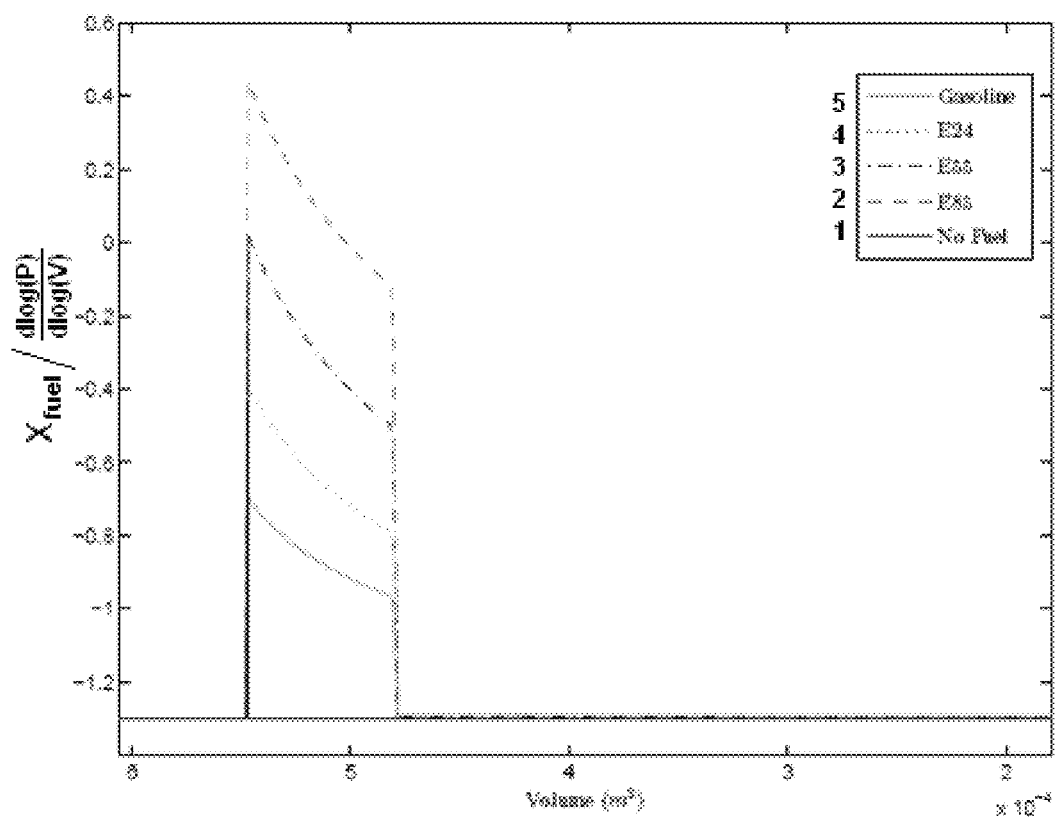
FIG. 11 is a plot of $$\frac{d \log P}{d \log V}$$

In one embodiment, the characteristic feature $X_{fuel}$ is at least partially based on a charge cooling effect. The charge cooling effect is observed when fuel is injected during the compression stroke. The injected fuel's vaporization cools down the cylinder charge, causing a deviation from the ideal polytropic process. One useable indicator of the charge cooling effect is an effective polytropic compression coefficient $n_{c,e}$. The effective polytropic compression coefficient $n_{c,e}$ is a function of combustion chamber volume, temperature, and pressure, as well as other factors and coefficients generated theoretically or through experimental data. The theoretical and mathematical determination of the polytropic compression coefficient $n_{c,e}$ is discussed in detail below, and FIG. 11 shows various polytropic compression coefficient $n_{c,e}$ plots versus combustion chamber volume.

Figure 10:
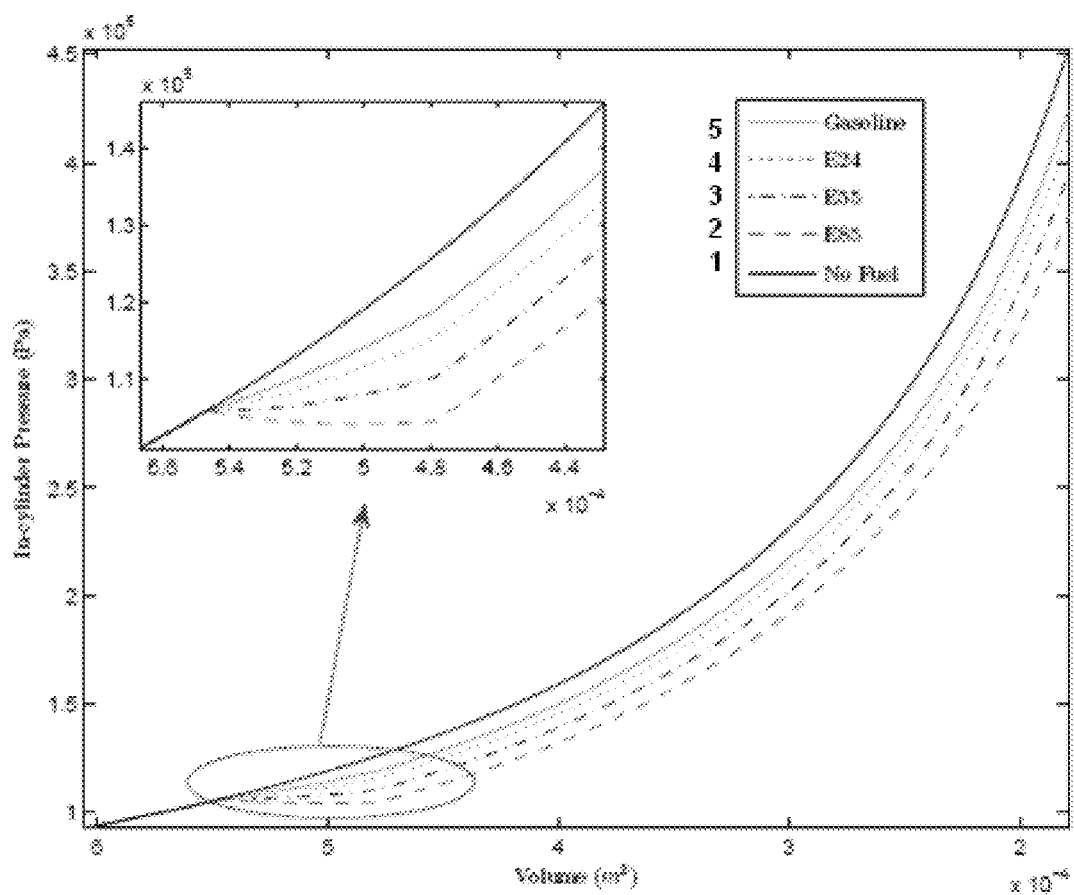
FIG. 10 is a plot of pressure versus volume that represents conditions within a combustion chamber during a compression stroke.

In another embodiment, the characteristic feature $X_{fuel}$ represents a drop in the in-cylinder pressures caused by the charge cooling effect of injected fuels. One useable result of the charge cooling effect that provides a useful characteristic feature $X_{fuel}$ is the final drop of the logarithmic in-cylinder pressure after fuel vaporization during the compression stroke. This value may be reduced to an effective charge cooling factor, $Residue_{gap}$, that captures the quasi-steady-state effects of the additional fuel vaporization and will be discussed in detail below. In an alternative embodiment, the characteristic feature $X_{fuel}$ is a function of engine parameters or engine states such as combustion chamber pressure during the compression stroke. FIG. 10 shows various plots of combustion chamber pressure versus combustion chamber volume for different fuels. In still other embodiments, the characteristic feature $X_{fuel}$ could be a function of other raw sensor measurements, or calculated/determined values, such as, for example an evaporation enthalpy $h_{evap}$ as discussed below.

SAE Technical Paper 2009-01-0657, titled "Ethanol Detection in Flex-Fuel Direct Injection Engines using In-Cylinder Pressure Measurements", authored by the inventors, and published in the proceedings of the 2009 SAE World Congress, Apr. 20, 2009, is incorporated by reference in its entirety herein, and discusses in detail two data-driven algorithms. The first data-driven algorithm, named the $N_c$ method, tracks the change of the effective polytropic compression coefficient, $n_{c,e}$, during fuel vaporization. The second data-driven algorithm, named the GAP method, tracks the final drop of the logarithmic in-cylinder pressure after fuel vaporization, the effective charge cooling factor $Residue_{gap}$, during the compression stroke. The deviations caused by the additional fuel injection during the compression stroke, when both intake and exhaust valves are closed, are extracted features for fuel composition recognition.

In one embodiment, a special operation mode is used to better determine the characteristic feature $X_{fuel}$. While operating in the special operating mode, the controller coordinates the injection and ignition timing to optimize the ability to determine the characteristic feature $X_{fuel}$. For example, homogeneous and homogeneous knock protection modes (see FIG. 5) may be used alternatively. In other embodiments, other engine operation modes dedicated for fuel composition recognition, such as those illustrated in FIG. 5 or their proper combinations, can be employed. Depending on other operation conditions (e.g., the engine speed and the intake air mass flow rate) this special operation mode for fuel composition recognition may occur following a pre-determined schedule, a trigger event, or other intelligent decision making process in the controller to achieve desirable engine performance.

The determination of the fuel composition state as described with respect to block 48 can take place in conjunction with either block 64, block 68, or not at all. Then at block 72, the characteristic feature $X_{fuel}$ is compared to a corresponding lookup table. The lookup table may be generated from experimental data and testing of various fuel compositions and various engine operating conditions including engine coolant temperature and engine loading, among other things. Alternatively, the lookup tables may be generated from theoretical calculations and derivations. For example, the lookup table may include the data as represented in FIG. 10 when the characteristic feature $X_{fuel}$ is the pressure data, and may include the data as represented in FIG. 11 when the characteristic feature $X_{fuel}$ is the polytropic compression coefficient $n_{c,e}$. In another example, the lookup table may include evaporation enthalpy data when the characteristic feature $X_{fuel}$ is evaporation enthalpy $h_{evap}$. A comparison of the characteristic feature $X_{fuel}$ with the data in the lookup tables yields a determination of the fuel composition at block 76.

The controller 22 houses numerous lookup tables for each different condition the engine 10 may experience and for the wide variety of fuel manufacturer's fuel blends and compositions (see FIGS. 10 and 11), such that an accurate determination of fuel composition may be made. Once the lookup table is selected, the characteristic feature $X_{fuel}$ is compared to the lookup table and the fuel composition is determined there-from at block 76. The comparison of the characteristic feature $X_{fuel}$ to values in the specific lookup table may be done in a variety of ways. For example, a point-by-point comparison may be done wherein each measured combustion chamber pressure is converted to a corresponding characteristic feature $X_{fuel}$ and subsequently compared to a corresponding lookup table. Alternatively, an integration of a combustion chamber pressure curve or an integration of a corresponding characteristic feature $X_{fuel}$ curve may be compared to an associated lookup table. In addition, derivatives may be used to isolate peaks and/or valleys for use in comparison to lookup tables. Other methods of comparison also exist and are well known to those skilled in the art. Whichever comparison technique is used, the results of the comparison to the lookup table at block 72 is used to determine the fuel composition at block 76.

After the fuel composition is determined at block 76, the method 60 returns to block 64 and continues to monitor the fuel composition. Concurrently, after the fuel composition is determined at block 76, an adaptation is triggered at block 80 that adapts the engine's operation settings such that the engine 10 may combust the fuel as efficiently as possible. The illustrated adaptation includes a first adaptation, or a fuel composition adaptation, wherein the engine's operation settings are adjusted in response to the determined fuel composition such that the engine 10 more efficiently combusts the fuel and the fuel-factor $f_{lambda}$ is maintained at unity (one).

The illustrated adaptation also includes a second adaptation, or fuel system adaptation, wherein the engine's operation settings are adjusted in response to variations in the fuel-factor $f_{lambda}$ that are not caused by a change in fuel composition but are instead caused by fuel system faults or air system faults (e.g., clogged injectors, faulty sensor or actuator, faulty mass airflow sensor, etc.) such that the engine 10 more efficiently combusts the fuel and the fuel-factor $f_{lambda}$ is maintained at unity (one). Therefore, as used herein and in the appended claims the phrase "fuel system adaptation" means an adaptation of the engine operating parameters based on any factor or factors other than a change in fuel composition. In one embodiment, the fuel system adaptation runs at substantially all times except during initial start-up before the EGO sensor is warmed up and operable (usually about two to four seconds after vehicle start-up), and except when the fuel composition adaptation is activated due to a detection of a change in fuel composition based on compression stroke data. In this embodiment, the EGO sensor and other data is used in the fuel composition adaptation (see FIGS. 7 and 8).

In another embodiment, the EGO sensor is not used for fuel composition adaptation. In this embodiment, the fuel composition adaptation runs simultaneously with and independently of the fuel system adaptation. The EGO sensor is used by the fuel system adaptation to monitor the engine and other vehicle operating parameters for fuel system faults and airflow system faults. Concurrently, the fuel composition adaptation may utilize the monitored pressure data to adapt the engine operating parameters to efficiently combust the fuel in the combustion chamber 14. This embodiment provides the vehicle with continuous fault checking (i.e., via the fuel system adaptation) throughout operation of the vehicle and without deactivating during operation of the fuel composition adaptation. In addition, the fuel system adaptation runs while the system is monitoring a pressure in a combustion chamber 14 of the engine 10 during a compression stroke and while the system is determining whether a fuel composition has changed from a first composition to a second composition, and from the second composition to a third composition.

FIG. 5 shows a variety of engine operating modes with different injection and ignition timing that may be used to adapt the engine 10 to operate more efficiently. In addition, the controller 22 may adjust the boost pressure, the intake and exhaust valve timing, the throttle angle, the fuel rail pressure, and the injection duration. In other embodiments, other adjustment and adaptations may be implemented, as desired.

In one example, a change in fuel composition is detected at block 76 and the fuel composition adaptation (i.e., first adaptation) is activated at block 80. Based on the fuel composition determined at block 76, an additional amount of fuel, $\Delta W_{fuel}$, to be injected during the next cycle is calculated in a feed-forward air/fuel control loop. In the mean time, the stoichiometric air-to-fuel ratio in the controller is updated and the fuel-factor $f_{lambda}$ is adjusted accordingly to maintain unity readings from the EGO sensor for a stoichiometric combustion. After the fuel composition determined at block 76 reaches a steady-state, no further fuel composition adaptation is considered required (i.e., the controller 22 recognizes a steady-state fuel composition), the adaptation at block 80 ends the fuel composition adaptation and initiates the fuel system adaptation (i.e., second adaptation).

The fuel system adaptation uses the measurements from the sensors such as the EGO sensor in the exhaust system and a hot-film air mass flow sensor (not shown) in the air path system, as well as the calculated/determined values in the controller, but not for the purpose of adapting to fuel composition. During the fuel system adaptation, the engine operation settings such as the fuel rail pressure and the injection duration are adapted to achieve stoichiometric combustion as indicated by the EGO sensor measurements. In addition, the information derived from the fuel system adaptation can also be employed for the fuel system diagnosis and fault monitoring. Fuel system adaptations to monitor system faults and to optimize engine operation are well known by those skilled in the art and will not be discussed further. In other embodiments, the adaptation at block 80 may include other adaptations and may monitor different aspects of the engine's operation.

Another way in which the method 40 may be utilized is shown in FIGS. 12 and 13. This embodiment utilizes the characteristic feature $X_{fuel}$ in a updating physical model that captures the effects of the fuel composition on the evolution of in-cylinder pressure during the compression stroke. Method 200 is similar to method 60 and the controller 22 records various engine states and parameters (e.g., combustion chamber pressure) during the compression stroke at block 64. During the operation of the method 200, the engine 10 may operate with any of the parameters of FIG. 5 or may operate under the special operation mode.

When sufficient data is recorded at block 64, various parameter identification techniques can be employed at block 68 to determine characteristic feature(s) $X_{fuel}$ from the data collected at block 64. In the preferred embodiment, the characteristic feature $X_{fuel}$ is a function of the physical fuel properties and may be directly measured, calculated, obtained from lookup tables, experimentally modeled, or derived through physical models, experimental data or any combination of methods, as desired. The controller 22 utilizes the pressure data, $P_{cyl}$, recorded within the combustion chamber 18 during the compression stroke to determine a characteristic feature $X_{fuel}$.

Once the characteristic feature $X_{fuel}$ is determined, it is utilized in block 204 to determine a fuel composition at block 208. The fuel composition determined at block 208 is indicative of the model's current fuel composition estimate and is constantly updated during the operation of the method 200. The controller 22 continuously operates the method such that the system is continually monitoring the fuel composition in blocks 64, 68, 204, and 208. The fuel composition determined in block 208 is used by the controller at block 212 to trigger an engine parameter adaptation to most efficiently oxidize the fuel within the combustion chamber 14.

FIG. 13 shows the logic pattern for the method 200. In the illustrated embodiment, the engine states recorded at block 64 are recorded in the form of a pressure $P_{cyl}$ inside the combustion chamber 14 during the compression stroke. Other engine variables may also be used in the method 200, as desired. The controller 22 then receives the $P_{cyl}$ data from the sensor 18 and uses it in a feature extraction at block 68 to determine the characteristic feature $X_{fuel}$. The characteristic feature $X_{fuel}$ is iterative on the method 200 and is dependant at least in part upon an estimated cylinder pressure, $\hat{P}_{cyl}$, determined by the model in block 208.

After the characteristic feature $X_{fuel}$ is determined at block 68, the method 200 utilizes the current fuel composition value to trigger a fuel composition adaptation and a model parameter adaptation. The model parameter adaptation updates all the internal operating factors of the model based on the new characteristic feature $X_{fuel}$. The model parameters are not directly used to modify any engine operating parameters but are instead only factors within equations and internal processes of the controller 22. The ethanol content adaptation uses the characteristic feature $X_{fuel}$ to update values of the physical model that are pertinent to and indicative of the fuel composition.

The ethanol content adaptation also communicates the current fuel composition value to the injection mode controller at block 212. The injection mode controller communicates with the fueling system to adapt the engine operating parameters to most efficiently oxidize the fuel in the combustion chamber 14. As the method 200 progresses, this adaptation at block 212 will constantly adjust in response to the outputs of the physical model.

At blocks 204 and 208, the controller 22 uses the inputs from the ethanol content adaptation, the model parameter adaptation, and the characteristic feature $X_{fuel}$ values to estimate a new fuel composition value. The model also calculates the estimated cylinder pressure $\hat{P}_{cyl}$ at block 204. The new estimated cylinder pressure $\hat{P}_{cyl}$ is then output to the feature extraction at block 68 to repeat the iterative process of comparing the measured cylinder pressure $P_{cyl}$ to the estimated cylinder pressure $\hat{P}_{cyl}$ to determine the characteristic feature $X_{fuel}$. This iterative process continuously adapts the fuel system operating parameters to most efficiently oxidize the fuel within the combustion chamber 14.

The illustrated model within the method 200 utilizes the cylinder pressure $P_{cyl}$ directly to determine the characteristic feature $X_{fuel}$. In other embodiments, various calculations, filters, and other parameters may be involved in the determination of the characteristic feature $X_{fuel}$.

Using the modeled and measured in-cylinder pressures, $\hat{P}_{cyl}$ and $P_{cyl}$, different features can be extracted for the ethanol content adaptation and the adaptation for other model parameters. One possible feature for the characteristic feature $X_{fuel}$ used in the ethanol content adaptation and the model can be the effective charge cooling factor, $Residue_{gap}$. The adaptation of model parameters and ethanol content can run simultaneously or coordinated alternatively, as desired.

To illustrate the concept of this model-based fuel composition recognition, the model proposed in the paper titled, "Modeling the Effect of Fuel Ethanol Concentration on Cylinder Pressure Evolution in Direct-Injection Flex-Fuel Engines", authored by the inventors, and published in the proceedings of the *American Control Conference*, St. Louis, Mo., USA, Jun. 10-12, 2009, and incorporated be reference herein in its entirety, is described as follows for the direct-injection engine 10 with gasoline-ethanol fuels. After a demanded amount of fuel is injected into the combustion chamber 14, the substances in the cylinders are composed of the liquid fuel and the gaseous mixture including fresh air charge, trapped/recirculated exhaust gas and vaporized fuel. During the fuel vaporization, the liquid fuel injected absorbs heat from the gaseous mixture while adding the vaporized fuel back to it. In the mean time, the gaseous mixture transfers heat with the chamber walls and conducts work during the compression. According to the laws of energy and mass conservation, the following state equations during the fuel vaporization process when both intake and exhaust valves are closed can be derived.

$$\frac{dT_{cyl}}{dt} = -\frac{(n_c - 1) \cdot T_{cyl}}{V_{cyl}} \dot{V}_{cyl} - \frac{\beta V_{cyl}}{c_v}(T_{cyl} - T_{wall}) +$$

$$\sum_i \frac{h^i_{fv}(T_{fl}) - u_{cyl}}{c_v m_{cyl}} \dot{m}^i_{fv} - \frac{\dot{Q}_{cyl,fl}}{c_v m_{cyl}} - \sum_i \frac{u^i_{fv}(T_{cyl}) - u_g(T_{cyl}, x_{eg})}{c_v m_{cyl}} \dot{f}^i$$

$$\frac{dm^i_{fv}}{dt} = \dot{m}^i_{fv} \text{ for } i = 1, \ldots, N, \text{ and}$$

$$\frac{dm_a}{dt} = 0, \frac{dm_{eg}}{dt} = 0$$

$$P_{cyl} = R \frac{m_{cyl} T_{cyl}}{V_{cyl}}$$

wherein,

"$\frac{dT_{cyl}}{dt}$"

represents the derivative of the temperature within the combustion chamber 14 with respect to time "$T_{fl}$" represents the temperature of the liquid fuel remaining in the combustion chamber 14

"$T_{wall}$" represents the wall temperature of the combustion chamber 14

"$m_{cyl}$" represents the mass of the gaseous mixture within the combustion chamber 14, including the fresh air charge, the recirculated exhaust gas, and the vaporized fuel "$m_{fv}^i$" represents the vaporized mass of the i-th fuel component within the combustion chamber 14

"$\dot{m}_{fv}^i$" represents the vaporization rate of the i-th fuel component within the combustion chamber 14

"f" represents the mass fraction of vaporized fuel among the gaseous mixture in the combustion chamber 14

"$x_{eg}$" represents the mass fraction of the recirculated exhaust gas among the sum of fresh air charge and itself "$n_c$" represents the effective polytropic compression coefficient of the gaseous mixture in combustion chamber 14

"$\dot{Q}_{cyl,fl}$" represents the heat transfer rate between the gaseous mixture and the liquid fuel in combustion chamber 14

"$\beta$" represents the heat transfer coefficient between the gaseous mixture and the chamber walls in combustion chamber 14

"$c_v$" represents the heat capacity of the gaseous mixture within the combustion chamber 14 and is derived from the following equation:

$$c_v = [c_{v,a}(1 - x_{eg}) + c_{v,eg} x_{eg}] \cdot (1 - f) + \sum_i c^i_{v,fv} \cdot f^i$$

where $c_{v,a}$ and $c_{v,eg}$ denote the heat capacities of the fresh air charge and the recirculated exhaust gas, while $c_{v,fv}^i$ denotes the heat capacity of the i-th component of the vaporized fuel "$h_{fv}^i$" represents the vaporization heat of the i-th fuel component "$u_{cyl}$" represents the internal energies of the gaseous mixture in the combustion chamber 14 and is calculated as $$u_{cyl} = u_g \cdot (1-f) + \sum_i u_{fv}^i(T_{cyl}) \cdot f^i$$

$$= [u_a(T_{cyl}) \cdot (1-x_{eg}) + u_{eg}(T_{cyl}) \cdot x_{eg}] \cdot (1-f) + \sum_i u_{fv}^i(T_{cyl}) \cdot f^i$$

where $u_a$ and $u_{eg}$ denote the internal energies of the fresh air charge and the recirculated exhaust gas, while $u_{fv}^i$ denotes the internal energy of the i-th component of the vaporized fuel "N" represents the number of individual fuel components "$m_a$" represents the mass of fresh charge inducted into the combustion chamber 14

"$m_{eg}$" represents the mass of exhaust gas recirculated into the combustion chamber 14

For the gasoline-ethanol fuel blends in this example, the fuel composition is linearly interpolated between the multi-component gasoline and the single-component ethanol as follows.

$$x_{fl,inj}^i = x_{fl,gas}^i \cdot (1-e) + x_{fl,etoh}^i \cdot e$$

where e is the ethanol content in the fuel, $x_{fl,gas}^i$ and $x_{fl,etoh}^i$ denote the mass fraction of i-th component in gasoline and ethanol.

Using the gas diffusion law, the fuel droplets vaporization is modeled as $$\dot{m}_d = k_{evap} \cdot \rho_d \cdot d_d \cdot D \cdot \ln(1+B)$$

"$\dot{m}_d$" represents the vaporization rate of the fuel droplet in the combustion chamber 14

"$k_{evap}$" represents the vaporization constant

"$\rho_d$" represents the average fuel droplet density in the injected spray

"$d_d$" represents the average fuel droplet diameter in the injected spray

"D" represents the diffusion coefficient of the fuel vapor

"B" represents the Spalding number

Figure 6:
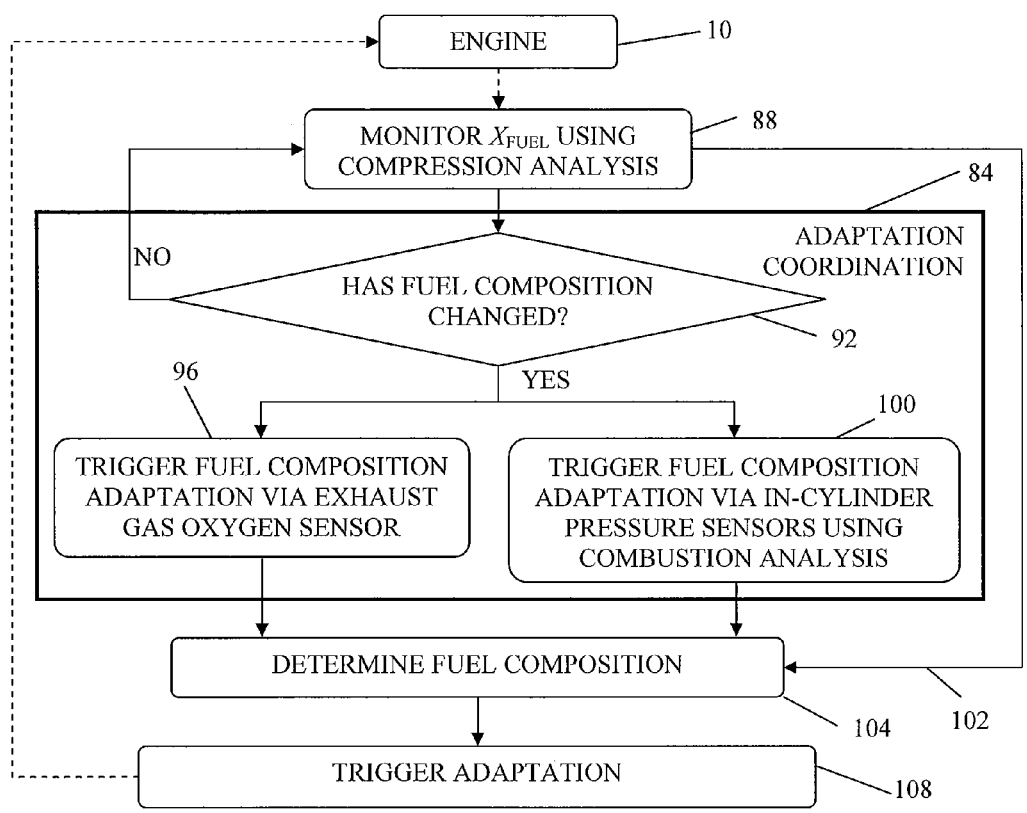
FIG. 6 is a flow chart corresponding to another embodiment of the invention.

Another way in which the method 40 may be utilized is shown in FIG. 6. During operation of the engine 10, a method or adaptation coordination 84 monitors the fuel composition within the combustion chamber 14 such that the engine may oxidize the fuel as efficiently as possible. At block 88, the controller 22 records a characteristic feature $X_{fuel}$ that is a function of the in-cylinder pressures collected from the combustion chamber 14 during the compression stroke as well as other data. For example, the combustion chamber pressure may be measured during the compression stroke of the engine 10 and the characteristic feature $X_{fuel}$ may be the polytropic compression coefficient $n_{c,e}$ of the fuel. In another embodiment, the characteristic feature $X_{fuel}$ may be a parameter of the fuel composition based on the processed data collected by the pressure sensor 18 during the compression stroke. In still other embodiments, the characteristic feature $X_{fuel}$ could be the raw data collected by the pressure sensor 18 during the compression stroke or other raw data or calculated/extracted values, such as, for example an evaporation enthalpy $h_{evap}$ as discussed below.

At block 92, the controller 22 analyzes the characteristic feature $X_{fuel}$ and recognizes if the fuel composition has changed (transient-state) or has stayed the same (steady-state) using the same technique described above. Other parameters and data (e.g., EGO data, combustion data, or any other combination of data) may also be used at 92 for the determination of a change in fuel composition. If the fuel composition is recognized to be in a steady-state condition, the adaptation coordination 84 returns to block 88 and continues to monitor the characteristic feature $X_{fuel}$.

If the controller 22 recognizes that the fuel composition is in a transient-state at block 92, then the adaptation coordination 84 triggers the implementation of known fuel composition adaptation routines at blocks 96 and 100. A fuel composition adaptation via the EGO is utilized at block 96 and a fuel composition adaptation via the pressure sensor 18 using features extracted based on the combustion properties of the fuel is utilized at block 100. The adaptations at blocks 96 and 100 may be used each individually, or in combination to adapt the engine operation settings such that the fuel is combusted as efficiently as possible. In addition, the adaptation based on data recorded at block 88 during the compression stroke, and as described above with respect to the methods 40 and 60, may be used for fuel composition adaptation as indicated by line 102. In other embodiments, other adaptations, sensors, and/or systems may be triggered by the recognition of a transient fuel state using data collected during the compression stroke of the engine 10. At block 104, the fuel composition is determined by the controller 22 based on the data received from the EGO sensor and the in-cylinder pressure sensor 18 during both the compression and combustion strokes. By utilizing the recorded parameters provided by multiple sensors, the controller 22 can make an accurate determination of the fuel composition within a set time as prescribed by regulations and government requirements.

After the fuel composition is determined at block 104, the controller 22 may trigger an adaptation at block 108 that adapts the engine's operation settings such that the engine 10 may combust the fuel as efficiently as possible. In other embodiments, the fuel composition may be determined individually in blocks 96, 100, and/or directly via the data collected during the compression stroke as described above with respect to the methods 40 and 60, and subsequently compared to provide an accurate fuel composition determination. In still other embodiments, any number of adaptations may be run with the same or different sensors. The adaptation coordination 84 may run continuously, after an initializing event, or at any other time during engine 10 operation.

Another embodiment of the invention will be described hereunder with respect to the method 112, shown schematically in FIG. 7. The invention integrates the analysis of the pressure profiles in the combustion chamber 14 of engine 10 during the compression and combustion events and the exhaust gas sensor information into adaptation functions. The illustrated adaptation functions are adaptation coordination 84, fuel composition adaptation 116, and fuel system adaptation 120.

A fuel composition adaptation via the EGO sensor is utilized at block 124 and a fuel composition adaptation via the in-cylinder pressure sensor 18 using features extracted based on the combustion properties of the fuel is utilized at block 128. The combustion features can be a function of the physical fuel properties and may be directly measured, calculated, obtained from lookup tables, experimentally modeled, or derived through physical models, experimental data or any combination methods, as desired. In one embodiment, the caloric value of the fuel, directly calculated from the measured in-cylinder pressures, is extracted as the characteristic feature. In another embodiment, the relations between the combustion parameters, such as the peak in-cylinder pressure and the duration for 10-90% burned mass fraction, and the ignition timing are used for fuel composition recognition according to the lookup tables. As stated above, there have been several prior art attempts to determine and/or monitor the fuel composition of an internal combustion engine using either the existing exhaust gas sensors or the additional in-cylinder high pressure sensors 18 during the combustion stroke. Various methods of analysis using the exhaust gas sensor and combustion analysis (i.e., during the combustion stroke) as well as other analyses can be implemented in blocks 124 and 128. The method 40 and 60 described above, investigating the vaporization properties of the fuel, such as the evaporation enthalpy, is realized via block 132 in FIG. 7.

Figure 7:
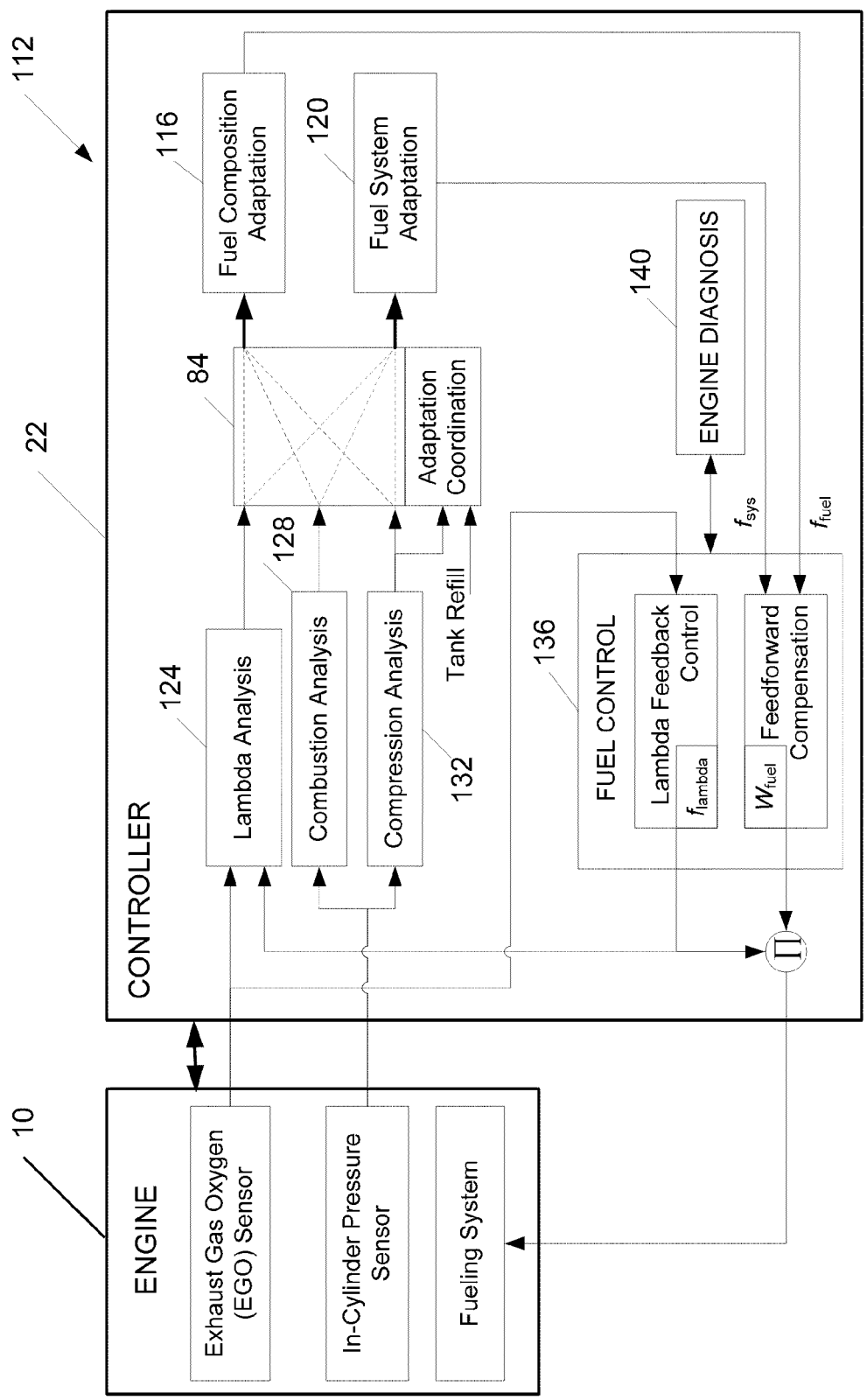
FIG. 7 is a flow chart corresponding to another embodiment of the invention.

In order to meet stringent restrictions on emissions, a fuel control system utilizes a feed-forward and feed-back fueling command at block 136 in FIG. 7 to regulate the air/fuel ratio (AFR) to stoichiometric AFR ($AFR_s$) during normal operations, and thus maintains unity (one) outputs at the exhaust gas sensor (i.e., the fuel-factor $f_{lambda}$ equals one). In the case of a transient-state fuel composition, the fuel-factor $f_{lambda}$ does not equal unity (one). The difference between the fuel-factor $f_{lambda}$ and unity (feed-back control) indicates the additional amount of fuel $\Delta W_{fuel}$ that should be injected into the combustion chamber 14 during the next engine cycle (feed-forward compensation) to achieve the desired stoichiometric combustion of the air/fuel mixture in the combustion chamber 14. Some engine controllers 22 employ the lambda feed-back fueling command for short-term (fast) correction of the fueling command and for a long-term (slow) adaptation of the feed-forward fueling command.

In addition to the normal operation variations, the readings from the exhaust gas sensor can vary due to faults in the fuel system. For example, a leakage in the fuel delivery system or a drift in the fuel injector may produce a change in the fuel-factor $f_{lambda}$ value. Moreover, since $AFR_s$ changes across various fuel blends, changes in the exhaust gas sensor's measurements can also be caused by a change of fuel in the combustion chamber 14.

In order to achieve desirable performance, it is helpful to distinguish the cause of the change in exhaust gas sensor measurements and apply the fuel system adaptation 120 or fuel composition adaptation 116 accordingly. The fuel system adaptation 120 includes a controller correction that compensates for aging sensors and/or actuators among other factors that may alter the performance of the engine 10 other than a change in fuel composition. The fuel composition adaptation 116 includes any adaptation associated with a transient-state of the fuel composition or any change related to the fuel within the combustion chamber 14. The method 40 investigates a different set of fuel properties (see FIG. 4) and as such, the results from the compression analysis as well as other events such as tank refilling are employed at block 84 to coordinate the fuel composition adaptation 116 and fuel system adaptation 120 appropriately.

It is worth noting that while a tank refilling or a vehicle starting event may be considered at block 84, the compression analysis at block 132 is independent of other events and may trigger a fuel composition adaptation any time a change in fuel composition is detected. The system does not depend on a tank refilling or vehicle starting operation to trigger a fuel composition adaptation and is therefore more robust. For example, if the tank's fuel level sensor (not shown) were to be rendered inoperable, the compression analysis would still function as usual to provide information to the adaptation coordination at block 84. Furthermore, the fuel level sensor may not be a good indication of fuel composition change. For example, if a small amount of fuel is added to the tank, or inadequate mixing has occurred (e.g., as might occur in a saddle-type tank) the fuel level sensor may not be a good indicator of a potential change in fuel composition. Inadequate mixing of the fuel within the fuel tank may also prolong the period of changing fuel composition within the compression chamber. This prolonged period makes the use of the EGO sensor for the fuel composition adaptation less desirable than using the compression data, as the fuel system adaptation will be delayed.

After a triggering signal is generated at block 84 (e.g., a tank refill, a restart, and/or a recognized change in fuel composition at any other time), various data fusion algorithms (e.g., voting schemes, game theory, Kalman filters, maximum likelihood estimators, neural networks, fuzzy logic, etc.) may be implemented in blocks 116 and 120 to integrate the information obtained from the lambda analysis as well as that from the combustion and compression analyses, which leads to more reliable and accurate adaptation for the fuel composition and system changes. Along with other information collected from the engine, the results of the fuel composition adaptation 116 and fuel system adaptation 120 can be used by the feed-forward compensation in the fuel control system at block 136 in the controller 22. At the same time, such information is also utilized for engine diagnosis at block 140 which provides the controller with necessary information for appropriate adjustments.

Figure 8:
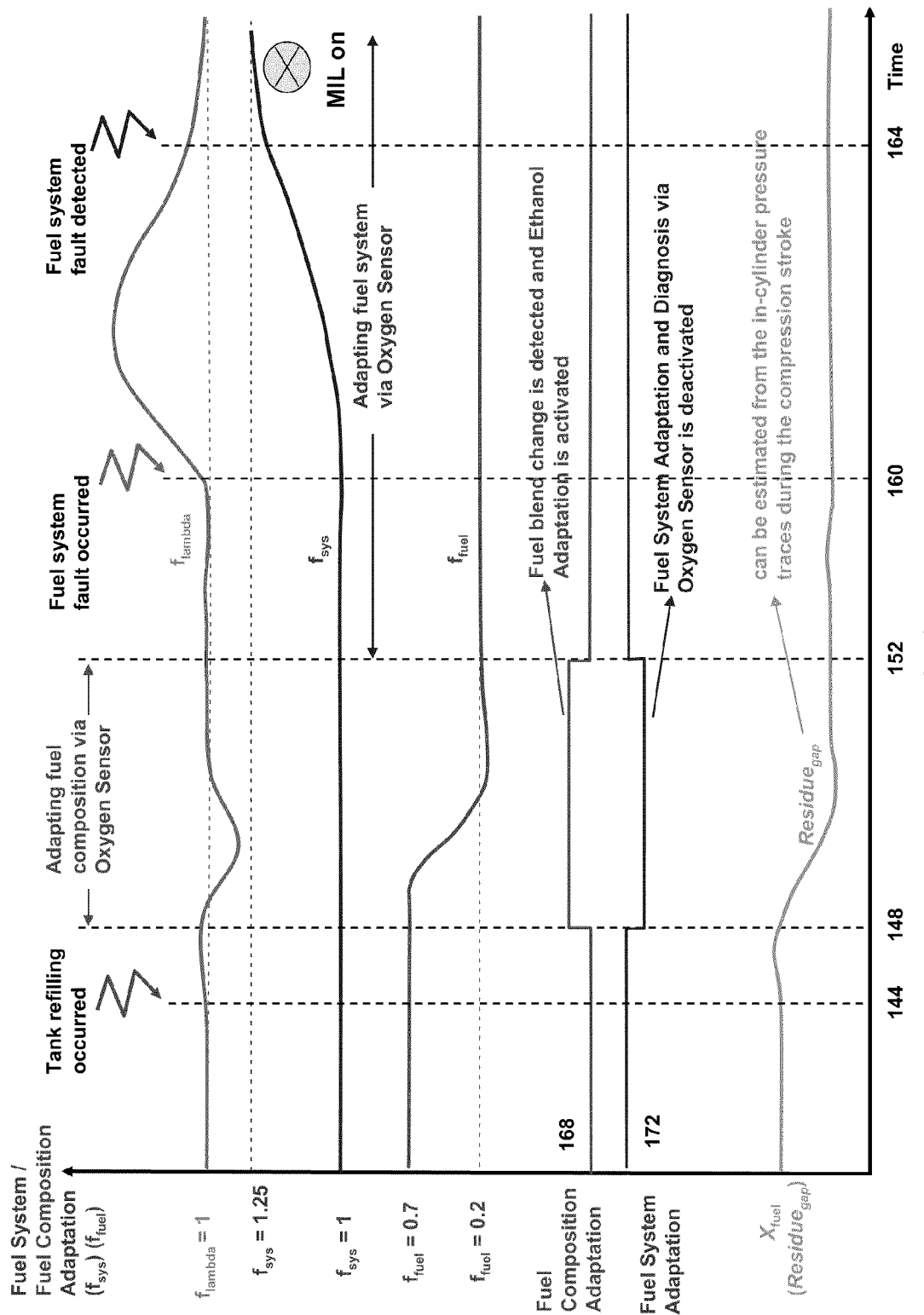
FIG. 8 is a chart corresponding to the methods of FIGS. 2, 3, 6, and 7.

To illustrate the concept underlying the method 112, the chart in FIG. 8 provides an example in a relative time-scale for engine management in a FFV by integrating the lambda analysis via the existing EGO sensor and the compression analysis via in-cylinder pressure sensor 18 in method 40. In this example, the fuel is considered to be a gasoline-ethanol blend whose volumetric percentage of ethanol is indicated by $f_{fuel}$. Here, $f_{lambda}$ denotes the multiplicative correction factor for the amount of injected fuel adapted via the EGO sensor, while $f_{fuel}$ and $f_{sys}$ denote the parameters calculated in the fuel composition adaptation and fuel system adaptation, respectively. For this example, the effective charge cooling factor $Residue_{gap}$, as calculated according to the reference paper titled "Ethanol Detection in Flex-Fuel Direct Injection Engines using In-Cylinder Pressure Measurements" from in-cylinder pressure during the compression stroke, is selected as the characteristic feature $X_{fuel}$. In other embodiments, the characteristic feature $X_{fuel}$ may be different parameters or fuel properties determined from the pressure data collected from the combustion chamber 14 during the compression stroke using the method 40, 56, 84 or 112 as desired. Moreover, triggering signals 168 and 172 are generated in the adaptation coordination block 84 in FIG. 7 to switch between fuel composition adaptations and fuel system adaptations. Accordingly, lines 148 and 152 denote the activation and deactivation times, respectively, of the fuel composition adaptation. Likewise, lines 148 and 152 denote the deactivation and activation times, respectively, of the fuel system adaptation.

After a non-empty tank (with E70 fuel in this example) is refilled with a different fuel (E0 fuel in this example) at time 144, the refilled fuel starts mixing with the fuel left in the tank and fuel delivery system to provide a new fuel composition (E20 in this example). Monitored by the compression analysis, the extracted feature, the effective charge cooling factor, $Residue_{gap}$, starts varying gradually because the effective evaporation enthalpy of the fuel that reaches the combustion chamber as well as its charge cooling effects starts varying as the ethanol content in the fuel decreases. At a first instant the lambda feedback control generates a fast short-term correction $f_{lambda}$ to adjust the amount of fuel to be injected so as to keep a stoichiometric combustion (i.e., unity readings from the EGO sensor). When a significant change in the effective charge cooling factor $Residue_{gap}$ is detected beginning at time 148, the fuel system adaptation is deactivated (as indicated by the downward step of signal 172) and the fuel composition adaptation (e.g., using the exhaust gas sensor) is activated (as indicated by the upward step of signal 168) and $f_{fuel}$ is modified to track the change in the fuel composition. As $f_{fuel}$ adapts to the new fuel composition, $f_{lambda}$ returns to its default value.

After the effective charge cooling factor Residue$_{gap}$ is considered to reach a steady-state at time 152, the fuel composition adaptation is deactivated (as indicated by the downward step of signal 168) while the fuel system adaptation is activated (as indicated by the upward step of signal 172). As such, when a change in fuel composition is detected based on the characteristic feature $X_{fuel}$ of the fuel during the compression stroke, the fuel composition adaptation is activated and the fuel system adaptation is deactivated. The fuel composition adaptation runs to completion, at which time the fuel system adaptation is reactivated and runs continuously thereafter until another change in the fuel composition is detected.

In this example, an injector drift (i.e., a fuel system fault) occurs at time 160 and $f_{lambda}$ again introduces a fast correction to compensate the effects of the fault and then returns to its default value after the long-term adaptation $f_{sys}$ captures these effects. Since the amount of fuel injected into the combustion chamber 14 is compensated for a stoichiometric combustion by the fuel-factor $f_{lambda}$, no significant change is detected in the extracted feature, the effective charge cooling factor Residue$_{gap}$. Thus, the fuel composition adaptation remains deactivated. After a considerable significant quasi-steady change is observed in $f_{sys}$ at time 164, the engine diagnosis system is able to identify that a fault has occurred in the fuel system based on the fact no change is detected in $f_{fuel}$. Therefore, with the additional information of the extracted feature, the effective charge cooling factor Residue$_{gap}$, provided by the compression analysis, normal operation variations, changes in fuel composition, and faults in the fuel system can be distinguished and compensated accordingly to achieve desirable performance.

As can be seen in FIG. 8, the characteristic feature $X_{fuel}$ of the fuel, based on the compression data, is continuously monitored during engine operation. As such, if a change in fuel composition is detected at any time, the fuel composition adaptation is activated and the fuel system adaptation is deactivated. While one example of this occurrence is shown between lines 148 and 152, it is to be understood that such a change could occur at other times (e.g., after line 164). This allows the engine control to better recognize, distinguish, and adapt to changes that impact engine operation (e.g., change in fuel composition, system faults, etc.).

In other embodiments, the characteristic feature $X_{fuel}$ of the fuel, based on the compression data, is intermittently monitored during engine operation. In other words, between the time the engine 10 is started and the time the engine 10 is stopped, the characteristic feature may be monitored several times in spaced intervals. For example, the system may monitor the characteristic feature $X_{fuel}$ for three minutes at the start of operation, or for any desired time frame, then monitor the characteristic feature $X_{fuel}$ for two minutes every fifteen minutes, as desired. Obviously, different timing or scheduling modes can be employed to maintain the desired level of monitoring. During each monitoring time period, the system is operable to detect a composition change in the fuel and trigger the fuel composition adaptation.

In one embodiment, after the system has recognized a change in fuel composition from a first composition to a second composition and adapted the engine operating parameters (via the fuel composition adaptation) to effectively combust the second fuel composition, the system continues to monitor (intermittently, continuously, or otherwise) the pressure in the combustion chamber 14 during the compression stroke. If during the monitoring, the composition of the fuel changes from the second composition to a third composition, the system recognizes the change, determines that the fuel composition has changed from the second to the third fuel composition, and reactivates the fuel composition adaptation to respond to the change.

The composition of the fuel may change after the first occurrence of the fuel system adaptation for myriad reasons. For example, further mixing of fuel within the tank, or degradation of the fuel over time. In some instances, ethanol rich fuels may absorb water and other fuel products to chemically change the make-up of the combustible materials such that the system recognizes a change in fuel composition and utilizes the fuel composition adaptation to make the appropriate corrections. Other changes may also occur to the fuel such that continued monitoring of the pressure within the combustion chamber 14 during the compression stroke provides a distinct advantage over prior art systems.

The controller 22 houses numerous lookup tables and dynamical models for each different condition the engine 10 may experience and for the wide variety of fuel manufacturer's fuel blends and compositions (see FIG. 4), such that an accurate determination of fuel composition may be made. Many techniques for data analysis, estimation, and detection exist and may be implemented in methods 40, 60, 84 and 112, as desired.

The methods 40, 60, 84, and 112 may be practiced with many different engine 10 arrangements as described above. In the preferred embodiment, a single cylinder is monitored such that cost is reduced while not compromising accuracy or repeatability. In other embodiments, each cylinder may be monitored, or in a multi-cylinder engine (i.e., a six cylinder engine), a single cylinder in each bank of cylinders may be monitored. In addition, any combination of cylinders may include monitoring systems as described above.

As stated above, different fuel compositions have different intrinsic properties that may be measured or calculated and subsequently be plotted as curves. The different fuel compositions provide different curves that may be used to differentiate one fuel composition from another. For example, different fuel mixtures exhibit different boiling temperatures and evaporation enthalpies among other things. These properties may be used to describe the theory of operation and to form lookup tables for the above described methods. Various properties of gasoline and an ethanol/gasoline mix fuel E85 are shown in FIG. 4. Other fuels may exhibit different properties. In addition, other properties may be utilized in the determination of the fuel composition.

The following theoretical description will make reference to various fuels represented in FIGS. 10 and 11 as lines 2-5. Line 1 represents a condition wherein no fuel has been injected into the combustion chamber. In other embodiments, the fuels represented in FIGS. 10 and 11 may be different.

A detailed description of the principles of the invention will be described with reference to FIGS. 9-11 and the method 40. When no fuel is injected (line 1) into the combustion chamber 14 during the compression stroke, the compression process can be approximately modeled as an ideal polytropic process where temperature and pressure are given by the following equations:

$$T_{cyl} = T_{ivc} \cdot \left(\frac{V_{cyl}}{V_{ivc}}\right)^{(1-n_{c\text{-}a})} \text{ and } P = P_{ivc} \cdot \left(\frac{V_{cyl}}{V_{ivc}}\right)^{-n_{c\text{-}a}}$$

wherein,

"$T_{cyl}$" represents the temperature within the combustion chamber 14

"$T_{ivc}$" represents the temperature within the combustion chamber 14 at IVC

"$V_{cyl}$" represents the volume within the combustion chamber 14

"$V_{ivc}$" represents the volume within the combustion chamber 14 at IVC

"$n_{c,a}$" represents the polytropic compression coefficient of air

"$P_{cyl}$" represents the pressure within the combustion chamber 14, and

"$P_{ivc}$" represents the pressure within the combustion chamber 14 at IVC

Figure 9:
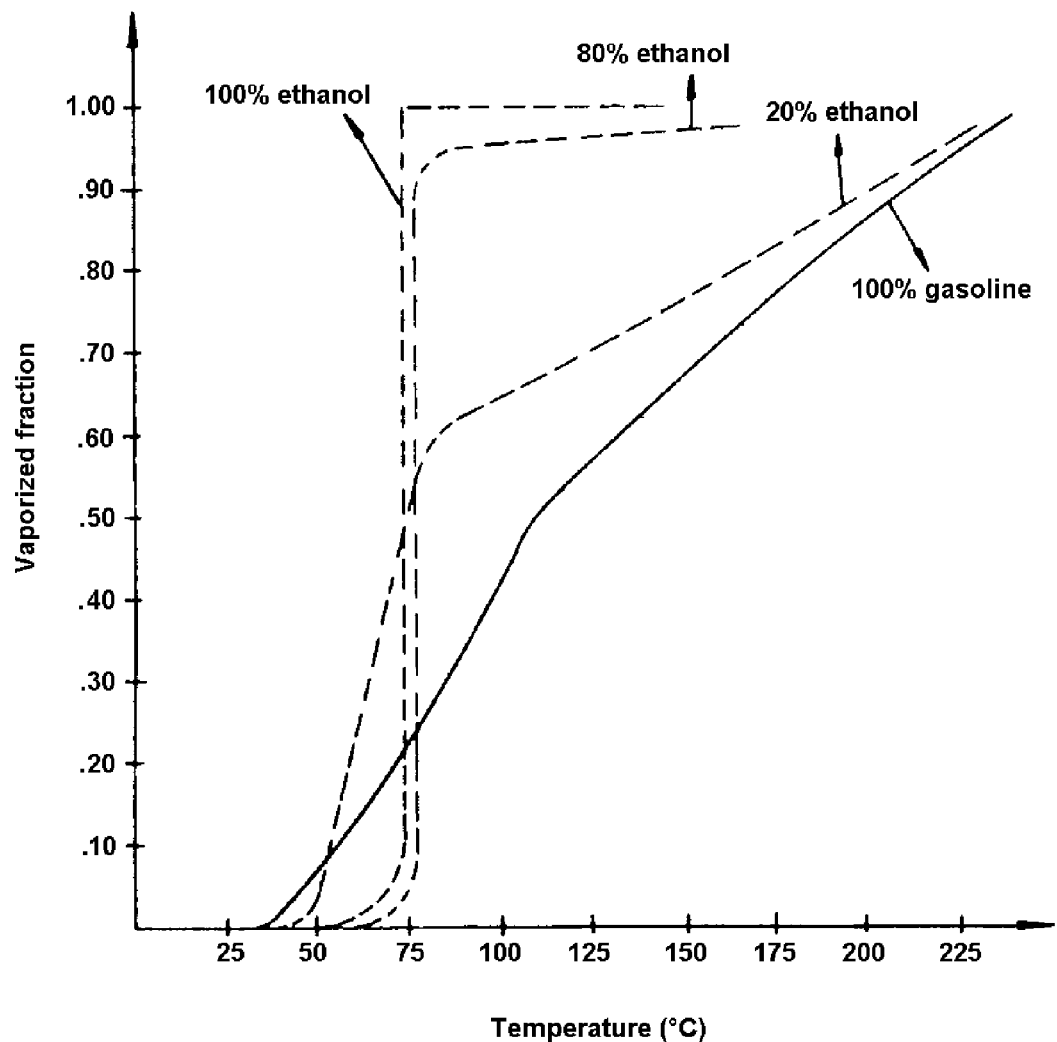
FIG. 9 is a plot of a vaporization fraction versus temperature.

When fuel is injected into the combustion chamber 14 during the compression stroke, heat is needed to vaporize the fuel and to raise its temperature to the ambient temperature in the chamber. As temperature rises during the compression stroke, a larger fraction of liquid fuel vaporizes. FIG. 9 shows the relationship between the temperature and the vaporization fraction of various ethanol and gasoline mixtures. The effects described above cause a deviation from the ideal polytropic process, which can be captured by the effective compression coefficient, $n_{c,e}$. By using energy conservation and some approximations, the compression process can be model by the following equations:

$$\frac{dT}{dt} = \left(1 + \frac{m_{fl} \cdot (1-e) \cdot \frac{\partial E_{gsl}(T,e)}{\partial T} \cdot q_{evap,gsl}}{m_a \cdot c_{v,a} + m_{fl} \cdot c_{v,fl}(e)}\right)^{-1} \cdot$$

$$\left\{\frac{-q_{vap,fl}(T,e) - c_{v,fl}(e) \cdot (T - T_{ini,fl})}{m_a \cdot c_{v,a} + m_{fl} \cdot c_{v,fl}(e)} \cdot \dot{m}_{fl} + \frac{(1-n_{ce}) \cdot P \cdot \dot{V}}{m_a \cdot R_a + m_{fl} \cdot R_{fl}(T,e)}\right\},$$

and $$P = [m_a \cdot R_a + m_{fl} \cdot R_{fl}(T,e)] \cdot \frac{T}{V}$$

wherein,

"$\frac{dT_{cyl}}{dt}$"

represents the derivative of the temperature within the combustion chamber 14 with respect to time "$q_{vap,fl}$" represents the latent heat of evaporation of the fuel "e" represents the percentage of ethanol in the fuel "$E_{gsl}(T,e)$" represents a vaporized fraction of a fuel mixture as determined from FIG. 9

"$c_{v,fl}$" represents the heat capacity of the fuel within the combustion chamber 14

"$q_{evap,gsl}$" represents the latent heat of evaporation of the pure gasoline

"$T_{ini,fl}$" represents the fuel temperature before injection into the combustion chamber 14

"$m_a$" represents the mass of the air within the combustion chamber 14

"$c_{v,a}$" represents the heat capacity of the air within the combustion chamber 14

"$m_{fl}$" represents the mass of the fuel within the combustion chamber 14

"$\dot{m}_{fl}$" represents the fuel injection rate into the combustion chamber 14

"$R_a$" represents the gas constant of air

"$R_{fl}$" represents the gas constant of the fuel

"$\dot{V}$" represents the volumetric flow rate of the fuel, and

"$n_{ce}$" represents the effective polytropic compression coefficient and is derived with the following equation:

$$n_{ce} = f(n_{c,fl}, n_{c,a})$$

wherein f is a function determined from experimental data

The coefficients $q_{vap,fl}(T,e)$, $c_{v,fl}(e)$, $R_{fl}(T,e)$, and $n_{c,fl}(e)$ are fuel thermodynamic constants which depend on the ethanol content in the fuel $e(e \in [0/1])$ and the properties of pure gasoline (gsl) and pure ethanol (eth) and can be approximated by the following equations:

$$q_{vap,fl}(T,e) = q_{vap,gsl} \cdot E_{gsl}(T,e) \cdot (1-e) + q_{vap,eth} \cdot e$$

$$R_{fl}(T,e) = R_{gsl} \cdot E_{gsl}(T,e) \cdot (1-e) + R_{eth} \cdot e$$

$$c_{v,fl}(e) = c_{v,gsl} \cdot (1-e) + c_{v,eth} \cdot e, \text{ and}$$

$$n_{c,fl}(e) = n_{c,gsl} \cdot (1-e) + n_{c,eth} \cdot e$$

Given that ethanol and gasoline have different thermodynamic characteristics, the deviation of the pressure trace from the ideal polytropic process (no fuel injection) depends on the percentage of ethanol in the fuel. FIGS. 10 and 11 show results for the pressure traces for different ethanol content in the fuel for a fixed injection rate, engine coolant temperature, and time.

In an ideal polytropic compression (without fuel injection) the relationship between log(P) and log(V) is linear. As a result, the graph of the derivative of log(P) with respect to volume $$\left(\frac{d\log(P)}{d\log(V)}\right)$$

FIG. 11) is a constant shown as line 1 in FIG. 11, corresponding to the slope of this linear relationship and is the negative of the polytropic compression coefficient for air $n_{c,a}$. If no fuel is injected, the fuel injection rate is zero and the equation that models the compression process becomes:

$$\frac{dT}{dt} = \frac{(1-n_{c,a}) \cdot P}{m_a \cdot R_a} \cdot \frac{dV}{dt}$$

$$\Rightarrow \frac{dT}{dt} = \frac{(1-n_{c,a}) \cdot T}{V} \cdot \frac{dV}{dt} \Rightarrow T = T_{ivc} \cdot \left(\frac{V}{V_{ivc}}\right)^{1-n_{c,a}}$$

$$\stackrel{ideal\_gas\_law}{\Longrightarrow} P =$$

$$P_{ivc} \cdot \left(\frac{V}{V_{ivc}}\right)^{-n_{c,a}} \Rightarrow \log(P) = -n_{c,a} \cdot \log(V) + \log(P_{ivc} \cdot V_{ivc}^{-n_{c,a}})$$

$$\Rightarrow \frac{d\log(P)}{d\log(V)} = -n_{c,a}$$

where,

"$\frac{dV}{dt}$"

represents the derivative of the volume within the combustion with respect to time When fuel is injected, the extra term that depends only on intrinsic fuel properties and injection rate is responsible for the deviation of the curves 2-5 from the ideal polytropic compression case.

As FIGS. 10 and 11 show, a detectable variation between the curves 2-5 exists that may be utilized by a control algorithm within the controller 22 to monitor the combustion chamber 14 in real-time to efficiently and accurately determine the fuel composition and make the proper adjustments to the engine 10 such that the engine 10 runs most efficiently. The various lookup tables are created using these principles along with experimental data. The controller 22 may use the lookup tables together with the principals outlined above, the detected pressure during the compression stroke, and other engine variables to determine what fuel composition is present within the combustion chamber 14 according to the method 40, 60, 84, 112, or other methods not mentioned herein. In other embodiments, different equations or theory background may be used with the methods 40, 60, 84, and 112. In addition, different methods may be used with the above theory. The spirit of the invention may be practiced with variations on the above disclosure and still fall within the scope of the invention.

In order to implement an ethanol content detection algorithm based on the equations described above that is able to work in a real engine environment, various parameter identification techniques such as Kalman filters, maximum likelihood estimation, and genetic optimization, are used along with experimental data.

Although the above theory was discussed with regard to ethanol and gasoline fuel mixtures, one skilled in the art would understand that the invention may be applied to various fuels and fuel mixtures. For example, the methods 40, 60, 84, and 112 and the above theory may be practiced with biodiesel/diesel mixtures, or any other combination of alternative and conventional fuels.

Various features and advantages of the invention are set forth in the following claims.

What is claimed is:

1. A method of operating an internal combustion engine, the method comprising:
   monitoring a pressure in a combustion chamber of the engine during a compression stroke;
   determining whether a fuel composition has changed from a first composition to a second composition based at least in part on the monitored pressure;
   in response to a determination that the fuel composition has changed, activating a fuel composition adaptation;
   after activating the fuel composition adaptation, determining that the fuel composition has reached a steady-state condition;
   in response to a determination that the fuel composition has reached the steady-state condition, deactivating the fuel composition adaptation; and
   after deactivating the fuel composition adaptation, determining whether the fuel composition has changed from the second fuel composition to a third fuel composition based at least in part on the monitored pressure;
   wherein monitoring the pressure in the combustion chamber of the engine includes determining a characteristic feature of the fuel that is a function of the pressure in the combustion chamber of the engine during the compression stroke.

2. The method of claim 1, wherein monitoring the pressure in the combustion chamber of the engine includes intermittently monitoring the characteristic feature during operation of the internal combustion engine.

3. A method of operating an internal combustion engine, the method comprising:
   monitoring a pressure in a combustion chamber of the engine during a compression stroke;
   determining whether a fuel composition has changed from a first composition to a second composition based at least in part on the monitored pressure; and
   triggering a fuel composition adaptation in response to a determination that the fuel composition has changed.

4. The method of claim 3, further comprising:
   after triggering the fuel composition adaptation, determining that the fuel composition has reached a steady-state condition; and
   deactivating the fuel composition adaptation in response to the steady-state condition.

5. The method of claim 4, wherein determining that the fuel composition has reached a steady-state condition is based at least in part on the monitored pressure.

6. The method of claim 3, further comprising deactivating a fuel system adaptation in response to a determination that the fuel composition has changed.

7. The method of claim 6, further comprising:
   after triggering the fuel composition adaptation, determining that the fuel composition has reached a steady-state condition; and
   reactivating the fuel system adaptation in response to the steady-state condition.

8. The method of claim 7, wherein the fuel system adaptation is operable to detect fuel system faults and airflow system faults not directly associated with fuel composition.

9. The method of claim 3, further comprising running a fuel system adaptation while monitoring a pressure in a combustion chamber of the engine during a compression stroke and while determining whether a fuel composition has changed from a first composition to a second composition.

10. The method of claim 3, wherein monitoring the pressure in the combustion chamber of the engine includes determining a characteristic feature of the fuel that is a function of the pressure in the combustion chamber of the engine during the compression stroke.

11. The method of claim 10, wherein the characteristic feature includes at least one of an effective polytropic compression coefficient of the fuel, an evaporation enthalpy of the fuel, an effective charge cooling factor of the fuel, and the monitored pressure.

12. The method of claim 10, wherein determining whether the fuel composition has changed includes monitoring the characteristic feature intermittently over time.

13. The method of claim 10, wherein determining whether the fuel composition has changed includes monitoring the characteristic feature continuously over time.

14. The method of claim 10, wherein the fuel composition adaptation includes determining a fuel composition of the fuel based at least in part on the characteristic feature.

15. The method of claim 14, wherein determining the fuel composition includes a comparison of the characteristic feature with a lookup table.

16. The method of claim 3, wherein determining whether a fuel composition has changed includes utilizing an updating physical model.

17. The method of claim 3, wherein the fuel composition adaptation includes determining a fuel composition of the fuel based on the pressure monitored in the combustion chamber during the compression stroke.

18. The method of claim 3, wherein the fuel composition adaptation includes adjusting engine operation settings.

19. The method of claim 3, wherein the fuel composition adaptation includes utilizing at least one of data from an exhaust gas sensor and data from a pressure monitored in the combustion chamber during a combustion stroke.

20. The method of claim 3, wherein determining whether a fuel composition has changed is based at least in part on a fuel tank refilling event.

* * * * *

UNITED STATES PATENT AND TRADEMARK OFFICE
CERTIFICATE OF CORRECTION

PATENT NO. : 8,185,293 B2  
APPLICATION NO. : 12/417240  
DATED : May 22, 2012  
INVENTOR(S) : Li Jiang et al.

Page 1 of 1

It is certified that error appears in the above-identified patent and that said Letters Patent is hereby corrected as shown below:

In the Detailed Description:

Column 12, line 37, change " $m_{fv}^i$ " to -- $m_{fv}^i$ --

Column 12, line 39, change " $\dot{m}_{fv}^i$ " to -- $\dot{m}_{fv}^i$ --

Column 12, line 66, change " $h_{fv}^i$ " to -- $h_{fv}^i$ --

Column 13, line 12, change " $u_{fv}^i$ " to -- $u_{fv}^i$ --

Column 13, line 25, change " $x_{fl,inj}^i = x_{fl,gas}^i \cdot (1-e) + x_{fl,etoh}^i \cdot e$ ," to -- $x_{fl,inj}^i = x_{fl,gas}^i \cdot (1-e) + x_{fl,etoh}^i \cdot e$ --

Column 13, line 26, change " $x_{fl,gas}^i$ and $x_{fl,etoh}^i$ " to -- $x_{fl,gas}^i$ and $x_{fl,etoh}^i$ --

Signed and Sealed this  
Seventh Day of August, 2012

David J. Kappos  
*Director of the United States Patent and Trademark Office*